United States Patent
Weiss et al.

[11] Patent Number: 5,900,877
[45] Date of Patent: May 4, 1999

[54] METHOD AND APPARATUS FOR MULTILEVEL SOFTWARE CONTROLS

[75] Inventors: Scott D. Weiss, San Francisco; David P. Davis, Sunnyvale, both of Calif.

[73] Assignee: Sybase, Inc., Emeryville, Calif.

[21] Appl. No.: 08/441,071

[22] Filed: May 15, 1995

[51] Int. Cl.⁶ ................................. G06F 3/00; G06F 3/14
[52] U.S. Cl. ........................... 345/356; 345/340; 345/345
[58] Field of Search ................................. 395/334, 339, 395/340, 341, 344, 345, 354, 356, 357, 347, 346, 974, 975, 326; 345/332, 333, 334, 339, 340, 345, 356, 354

[56] References Cited

U.S. PATENT DOCUMENTS

| | | | |
|---|---|---|---|
| 4,868,765 | 9/1989 | Dienfendorff | 345/120 |
| 5,412,776 | 5/1995 | Bloomfield et al. | 395/356 |
| 5,425,141 | 6/1995 | Gedye | 395/345 |
| 5,463,728 | 10/1995 | Blahut et al. | 395/344 |
| 5,581,670 | 12/1996 | Bier et al. | 345/326 |
| 5,590,265 | 12/1996 | Nakazawa | 395/340 |
| 5,615,347 | 3/1997 | Davis et al. | 395/346 |

OTHER PUBLICATIONS

Petzold, C., *Programming Windows*, Second Edition, Microsoft Press, pp. 605–636, 1990.

*Primary Examiner*—Raymond J. Bayerl
*Assistant Examiner*—Cao H. Nguyen
*Attorney, Agent, or Firm*—John A. Smart

[57] ABSTRACT

A method and apparatus for providing multi-layered graphical user interface controls is described. The user interface controls are comprised of several graphic control layers, each having a transparent region and an opaque region. User input actions over a transparent region is effective to tunnel the user input action to the next graphic control layer until the user input action is determined to occur over an opaque region of a subsequent graphic control layer. In one embodiment, the present invention includes push button and radio button controls. In other embodiments, the present invention includes check boxes, sliders and lists. In a preferred embodiment, the present invention includes backout behavior in which a selection action over an opaque region followed by motion into a transparent region is effective to cause the appearance of the graphic control layer to change from an activated appearance to an deactivated appearance without tunneling the input action to the next graphic control layer.

47 Claims, 16 Drawing Sheets

METHOD AND APPARATUS FOR MULTILEVEL SOFTWARE CONTROLS

BACKGROUND OF THE INVENTION

1. The Field of the Invention

The present invention relates to software user interfaces. More specifically, the present invention is related to graphical interfaces for software control of computer functions.

2. The Relevant Art

The development of graphic user interfaces for computers has helped catalyze the explosive growth of the computing industry and especially the personal computing industry. By providing an ability to control the operation of software through the use of screen controls having an appearance similar to common mechanical devices such as push buttons, radio buttons, check boxes, sliders and lists, computing has become accessible to many people who would otherwise be intimidated by the traditional command line interfaces common to the mainframe computing environment that require the user to master numerous complex strings of instructions. In contrast, the user of a graphical interface can take advantage of the intuitive nature of the graphic control elements which, e.g., allow user to turn "on" or "off" parameters by simply "pushing" a button. Thus for example, both the Macintosh® and Microsoft® Windows operating systems have developed a widespread and loyal following among computer users based on the relative ease of use provided by the graphic user interfaces of those products.

The structure of graphical user controls is well known in the art. The controls are constructed using bitmapped images or vector graphics to provide the image of the control that the user views on the computer screen (e.g., a circle for a radio button or a rounded rectangle for a push button). Generally graphic user controls comprise two graphic layers, only one of which is displayed at any time. The first layer typically is an image of the control in a non-activated state (e.g., an unpressed button). The second is an image of the control in an activated state (e.g., a depressed button). In some cases, the button will remain displayed after the user has performed an input or selection action on the control. For example, after selecting a radio button, the graphic representing the button remains in the activated state. However, a push button may only display an activated state graphic for the duration of the selection action.

In operation, the operating system determines whether a user input device, such as a mouse-controlled cursor or stylus, is over the control by determining the screen location of the user input device and then comparing the location of the device with the coordinates of a "bounding box" that surrounds the graphic control image. When the operating system of the computer senses that a user input has been moved over the control, a user selection action, e.g., depressing a physical button on the mouse, is processed by the operating system to produce an action corresponding the "activation" of the graphical control (i.e., the button). The action produced by the system generally is determined by the software that generates the image of the button.

Although graphic user interfaces have enjoyed tremendous success in the computing industry, their limitations have become apparent. In general, present graphic user controls can be displayed in only one of two states, e.g., an "on" state and an "off" state. In a few cases (e.g., Motif and Windows) buttons having three states are available. Although this works for applications in which decisions that are binary or ternary in nature, there are still many other applications where more flexibility is needed. For example, using present graphic control technology a computer program can only offer the user an "on" or "off" state or "high", "medium" and "low" states. However, many situations exist in which it would be preferable to offer the user a greater range of options without cluttering the screen. For example, it would be useful to offer users networked to several printers a single button that can "toggle" between the different printers rather than presenting a list of printers that would clutter the user's screen. Such flexibility would decrease substantially the complexity and bulk of the interface.

Another limitation with current graphical user interface technologies stems from the limitation that user controls are activated (or deactivated) by placing a control device (e.g., a mouse or stylus) within a rectangular region surrounding the control (called the "bounding box") regardless of the shape of the control itself. Thus, for controls that are not inherently rectangular in shape (in which case the bounding box and control graphic can be made co-extensive), the user can be faced with unexpected results. For example, the user may make an action within the bounding box, but not on the control device, and yet initiate a system action.

In addition, the requirement that buttons have rectangular bounding boxes limits their application in providing the visually appealing and intuitive interfaces that have so greatly enhanced the utility of the computer. For example, in a database of materials for a complex device such as a jet engine, it would be advantageous to apply graphical user interface technology to produce a representation of a jet engine that can be dissected by activating graphical control objects corresponding to the parts of the engine. Unfortunately, the placement of non-rectangular graphic control devices representing the engine parts is limited by the need to prevent the overlapping of adjacent bounding boxes so as to avoid conflicts between control elements.

Thus, it can be seen that it would highly desirable to provide a graphic user interface where user input actions within the bounding box of a graphic control element did not activate that element. In addition, it would be preferable to have graphic control elements that could provide the same high degree of intuition found presently but allowed for a greater range of user input choices.

SUMMARY OF THE INVENTION

The present invention includes a method and apparatus for providing multi-layer graphic control elements. Using the method and apparatus of the present invention, graphic controls can be constructed for graphic user interfaces that provide users with more sophisticated computer controls having greater utility in addition to a more intuitive design.

In one aspect, the present invention includes a multi-level software user interface for controlling the operation of the computer using graphic control layers. The graphic control layers each include an object having a transparent region and an opaque region. User input actions over the opaque region of the graphic control layer are effective to generate a system message associated with that layer, while user input actions over a transparent region are effective to transfer the user input action to a different graphic control layer. Preferably, the layers are stacked and a user input action over a transparent region transfers the action to the next lower graphic control layer.

In one preferred embodiment, the graphic control layers correspond to push buttons. In another preferred embodiment, the graphic control layers further include layers depicting activated and deactivated button states. In still another preferred embodiment, the present invention includes graphic control layers corresponding to check boxes. In yet another preferred embodiment, the present invention includes graphic control layers corresponding to a slider. In still another preferred embodiment, the present invention includes graphic control layers corresponding to a list control. In still yet another embodiment, the present invention includes graphic control layers corresponding to a scroll bar, alone or in combination with screen buttons.

In another aspect, the present invention includes an apparatus for providing a software user interface comprising of plurality of graphic control layers. The apparatus of the invention includes means for providing a plurality of graphic control layers each including an object having a transparent region and an opaque region. In addition, means are provided for initiating a user input action over either the opaque or transparent region a graphic control layers. Means for generating a system message in response to a user input over an opaque region are provided in addition to means for transferring the input to another graphic control layer in response to a user input over a transparent region.

In still another aspect, the present invention includes a method for controlling the operation of a computer system using a multi-level software user interface having a user input device. The method includes providing a plurality of graphic control layers each having a transparent region and an opaque region. In addition, the method includes generating a user input action over a graphic control layer and determining whether the input action occurred over an opaque or a transparent regional graphic control layer. If the user input action occurred over the transparent region then the action is transferred to the next lower graphic control layer. This transfer of control to the next lower graphic control layer is continued until a determination is made that the user input action has occurred over an opaque region or background page. In a preferred embodiment, a determination is made as to whether the object is a vector graphic object, a bitmapped object, a text object, or the like.

Other features and advantages of the present invention will become apparent when the following detailed description is read in conjunction with the accompanying Figures.

BRIEF DESCRIPTION OF THE DRAWINGS

FIG. 3A illustrates a graphic control push button which is comprised of two graphic control layers, each of which layers constitutes a separate push button. FIGS. 3B and 3C illustrate the change of appearance of a graphic control layer of the present invention from an inactive state to an active state.

DESCRIPTION OF SPECIFIC EMBODIMENTS

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Figure 1:
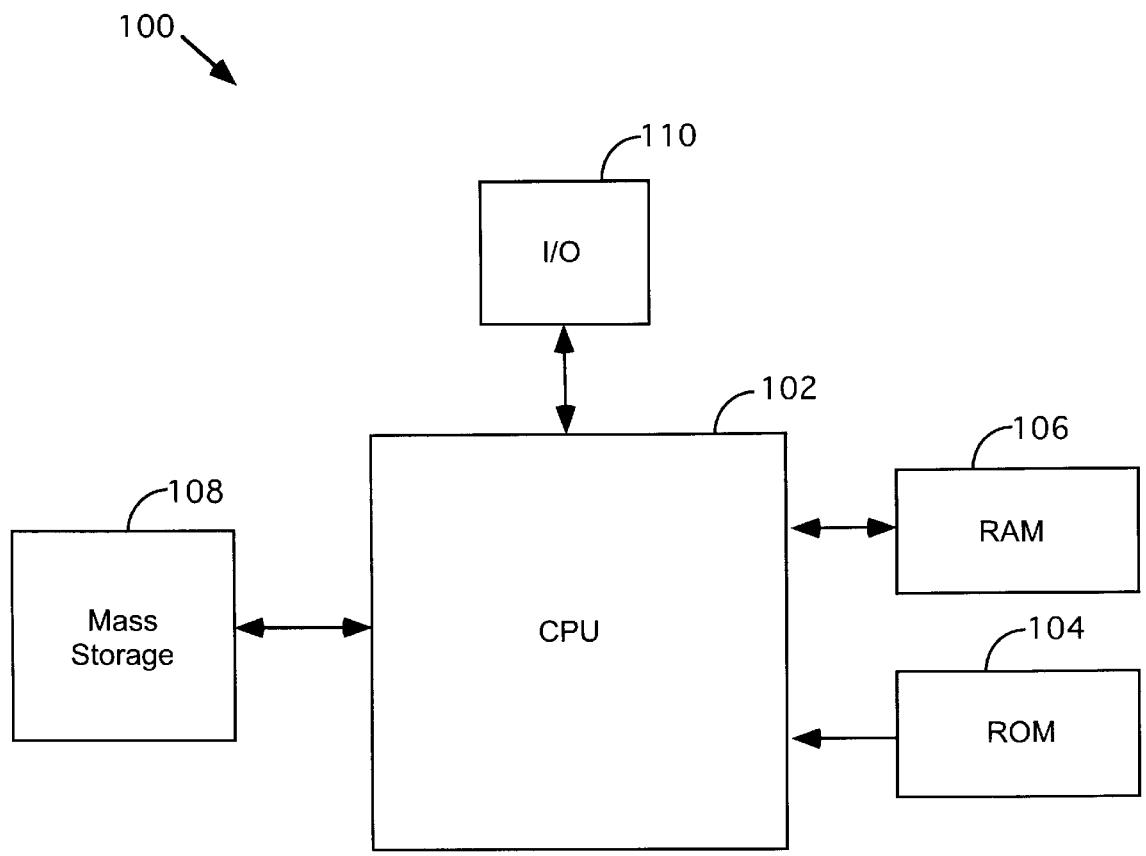
FIG. 1 is a schematic description of a computer system in accordance with the present invention.

FIG. 1 illustrates schematically a typical computer system configuration in accordance with the present invention at 100. Such a hardware system configuration includes a central processing unit ("CPU") 102 which is coupled unidirectionally with read only memory ("ROM") 104 and bidirectionally with volatile random access memory ("RAM") 106. CPU 102 is further coupled to non-volatile mass storage 108, which mass storage may be used to store programs, data and the like. Mass storage can comprise a magnetic or optical medium such as a hard-disk, floppy disk, CD ROM, magnetic or paper tape reader, or some other well known storage device. The CPU is further coupled to input/output means 110 which means typically include a monitor and/or keyboard and may further include a pointer device such as a mouse or stylus. Input/Output means 110 may also comprise a transducer card reader, a magnetic or paper tape reader, a tablet and stylus, a voice or handwriting recognizer, or some other well-known input device such as, of course, another computer. In one preferred embodiment, input/output means 110 includes a display monitor which is used to display the images being generated by the present invention. Such a display monitor may take the form of any of several well-known varieties of cathode ray tube displays or some other well known type of display, e.g., a liquid crystal or plasma display. Other alternatives will be apparent to those of skill in the art.

In operation, ROM 104 typically supplies basic operating instructions to the CPU which are necessary for proper CPU function and the operation of software stored in RAM 106 and mass storage 108. RAM 106 holds information which is generally transient in nature, such as programs being run by the CPU and data associated with those programs. The CPU receives instructions from the user or operator, and displays information to the user or operator, through input/output means 110. The operation of each of these elements is well known to those skilled in the art, as is the combination of these elements to form a computer system.

Figure 2:
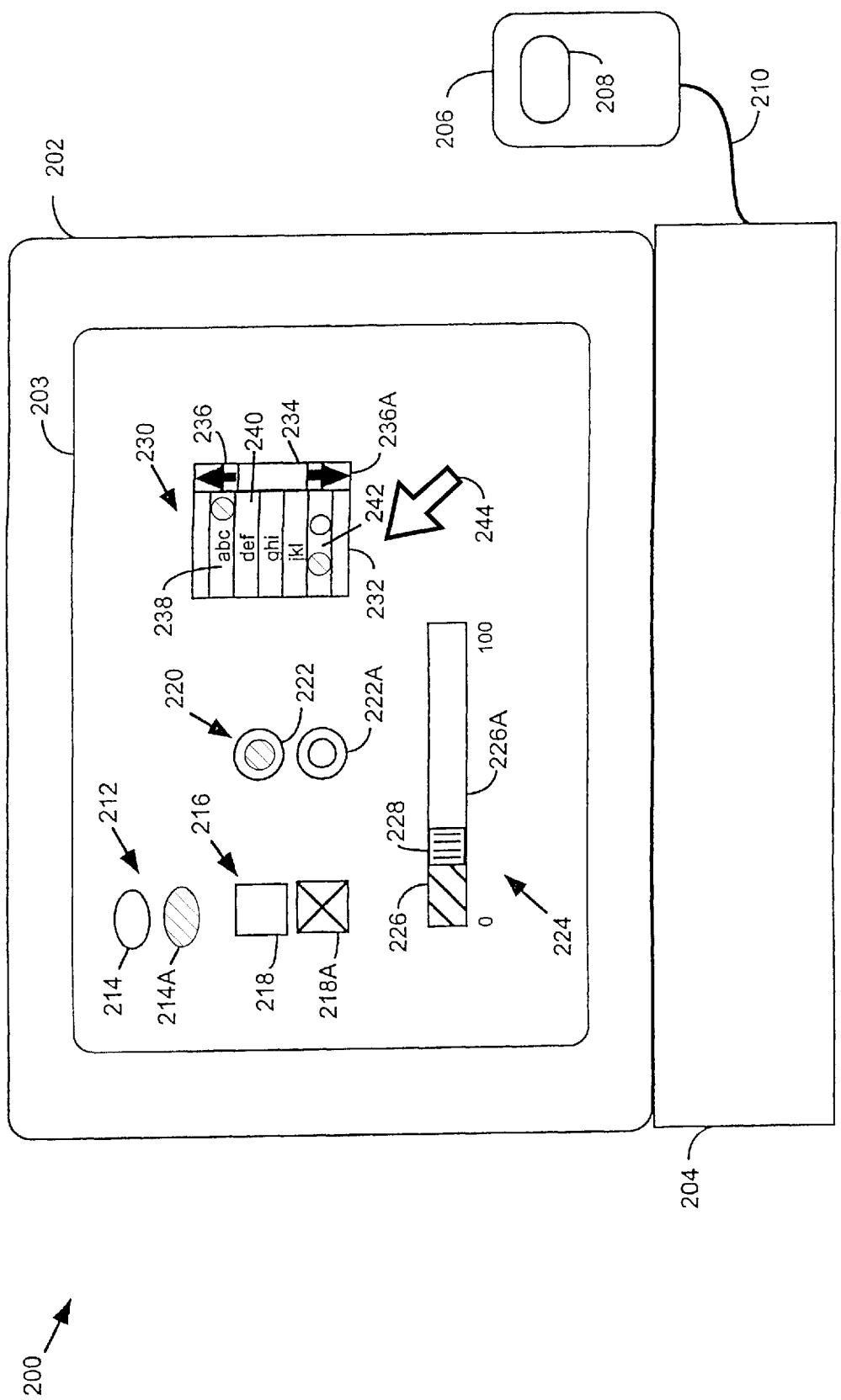
FIG. 2 is a depiction of a computer system including a monitor and screen on which is displayed a variety of graphic control elements for controlling the operation of a computer system.

FIG. 2 illustrates an external view of a computer system configuration in accordance with the present invention at 200. The computer system includes a display monitor 202 housing a screen 203, a base 204, and, in a preferred embodiment, a mouse 206 including a button 208 and a cable 210 for providing communication between mouse 206 and base 204. Monitor 202 and screen 203 are of standard design and construction as described above with respect to input output means 110 of FIG. 1. Base 204 is a housing that typically provides an enclosure for the central processing unit memory and/or mass storage devices for the computer system. It will be appreciated that base 204 may be of the type that is used commonly with personal computers, or base 204 may represent a mini computer or a mainframe computer that is located remotely from monitor 202.

Mouse 206 is an input device frequently used with computing devices, the design and construction of which is well known to those of skill in the art. Briefly, mouse 206 comprises sensor circuitry which translates the motion of the mouse into signals (e.g., electrical or infrared impulses) that can be interpreted by the CPU of the computer, such as CPU 102 of FIG. 1. Motion of the mouse causes a corresponding motion of a cursor, such as arrowhead cursor 244, across the screen to allow the user to navigate among the various graphical controls displayed. The mouse generally includes one or more buttons, such as button 208, that translate user input actions into signals that are relayed to the CPU for processing. In general, the mouse and CPU are designed such that both the actions of depressing the mouse button 208 and releasing the mouse button 208 are registered with the CPU. The design and construction of base 204 and mouse 206, and their principles of operation, will be well familiar to those of skill in the art. However, it will be appreciated that other control devices capable of translating user actions into computer inputs for controlling the operation of a computer, for example, a stylus, can be employed without departing from the present invention.

In a preferred embodiment, computer system 200 is capable of displaying a variety of graphic control elements on computer screen 203. As used herein, the term "graphic control element" will be taken to mean one or more bit-mapped or vector graphic entities which, when activated by an appropriate user input action, produce a system message that can be acted upon by software running on the CPU. By "user input action", it is meant herein the activation of a graphic control element using a input device such as a mouse, stylus, keyboard, finger or the like. The detailed structure of the graphic control elements of the invention will be described in greater detail below. However, the principles of correlating user input actions with appropriate software response will be familiar to those of skill in the art.

As illustrated on screen 203 of FIG. 2, the graphic control elements of the invention include push button controls 212, which push button controls may exist in an unpressed state 214 or a pressed state 214A. The graphic controls of the invention may also include check boxes such as shown generally at 216, which check boxes include an unchecked state 218 and one or more engaged or checked states such as shown at 218A. The graphic control elements may further include radio buttons such as shown at 220 including an activated state 222 and a deactivated state 222A. Also included in the present invention are sliders such as shown at 224. The sliders include a display having a first graphic region 226 a second slider region 226A and a slider thumb 228.

Still further included in the present invention are list control elements 230 which list control elements include a display area 232, optionally including a scroller 234 having arrow push buttons 236 and 236A. The list area 232 includes list options that may include text and graphics such as shown at option 238, text alone such as shown at option 240 or graphics alone such as shown at option 242. A preferred system for handing graphic objects is *Gain Momentum®* from Sybase of Mountain View, Calif. However, it will be appreciated that the principles of their operation and their integration with the operating system of, and software running on, the computer system will be familiar to those of skill in the art and that other graphic user interfaces can be employed with the present invention.

The graphic control elements of the invention comprise one or more graphic control layers, which layers comprise bitmapped graphic objects, vector graphic objects or combinations of bitmap and vector graphic objects. These bitmapped, vector graphic or bitmapped/vector graphic objects include both transparent (in the case of bitmapped objects) or clear (in the case of vector graphic objects) regions in addition to opaque regions. As will described in greater detail herein, user input actions over the opaque regions of the graphic control layers are effective to initiate system messages which may be acted upon by the operating system or other software running on the computer.

However, user input actions that occur initially over a transparent or clear region of a graphic control layer of the invention are transferred to a graphical control layer other than the graphic control layer at which the user input action occurs initially. In other words, input actions that occur over transparent or clear regions of a graphic controls layer of the preset invention "fall through" that layer to another layer, preferably a layer immediately below the present graphic control layer over which the input action initially occurs. Thus, it will be appreciated that the present invention allows for the construction of complex graphic control elements by layering one or more graphic control layers so as to provide graphical input devices having greater utility than available heretofore.

An illustration of such a graphic control element comprising a plurality of graphic control layers, each of which layers comprises transparent and opaque regions, is illustrated in FIG. 3. Shown at 300 is a graphic control element appearing as it would to a user of a computer system, such as system 200 of FIG. 2. Graphic control element 300 is illustrative of a "push button" or "radio button" graphic control element. As used herein, the term "push button" indicates a control element that acts as a physical button, displaying a depressed state only while a user input action is being initiated on the button. The term "radio button" indicates a button control element which remains depressed after a user input action has occurred on the button. These terms will be familiar to those of skill in the art.

Button 300 includes a bounding box 302 (dashed lines) which generally is not visible to the user. Within bounding box 302 is included a control element 304, which appears as two generally semicircular buttons 305A and 305B. Control element 304 can be a button, check box, radio button, or the like, that when activated by a user input action (e.g., selection by a mouse) is effective to send a system message which is responded to by software operating on the computer system.

Figure 3A:
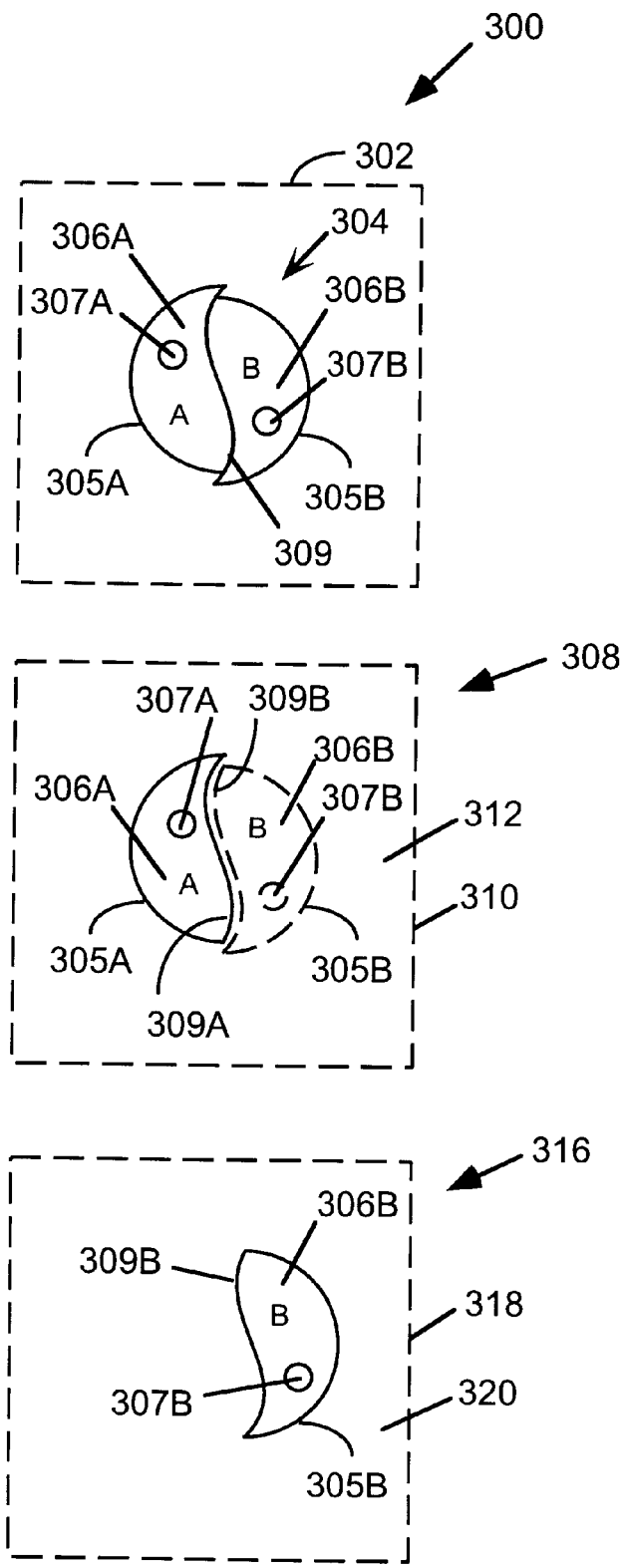
FIGS. 3A, 3B, and 3C are illustrations of graphic control elements in accordance with the present invention.

In the example shown in FIG. 3A, graphic control element 304 comprises two generally semicircular buttons 305A and 305B. A user input action over button A is effective to produce the generation of a first system message while a user input action over button 3 is effective to generate a second system message. Button 305A includes an opaque region 306A and an interior transparent region 307A. Similarly, button 305B includes opaque and interior transparent regions 306B and 307B respectively. The buttons are separated along a serpentine boundary 309. A portion at the top of opaque region 306A of button 305A extends above button 305B; and, similarly, a portion at the bottom of opaque region 306B of button 305B extends below button 305A.

Graphic control element 300 however is not an integral construction in which buttons 305A and 305B exist within a single graphical control layer. Rather graphic control element 300 comprises two graphical control layers 308 and 316, containing buttons 305A and 305B separately. Control layer 308 includes a bounding box 310 within which is contained button 305A (including opaque region 306A, and interior transparent region 307A). The button is located in a transparent region 312 of layer 308. As illustrated by the dashed lines, button 305B appears to reside at layer 308. However, this graphic control actually resides at the lower graphic control layer 316. Graphic control layer 316, includes button 306B (with opaque region 306B and transparent region 307B) residing in a transparent region 320, both of which are bounded by a bounding box 318. Button 306B can be viewed from layer 308, however, as it is beneath the transparent region 312 of graphic layer 308. Thus, the layering of graphic control layer 308 on top graphic control layer 316 can be seen to produce the effect of having two side-by-side semicircular buttons 305A and 305B in graphic control element 300.

In operation, a user input action over the opaque region of graphic control element 308 corresponding to button 305A (i.e., opaque region 306A) will be effective to generate a system message which is processed consistently with the option represented by button 305A. A user input action in transparent region 312 of layer 308, but over the opaque region 306B of button 305B, will "fall through" layer 308 to layer 316 and activate button 305B to generate a system message which is processed consistently with the option represented by button 305B.

A user input action in the transparent region of graphic control layer 308, or within the interior transparent portion 307A of button 305A, and over the transparent region of graphic control layer 316 will fall through both layers 308 and 316 to either be processed upon reaching an opaque region of an additional graphic control layer (not shown) or the "page" on which the graphic control layers are arranged. As used herein, the term "page" refers to the base graphic layer on which all other graphics and objects are arranged. Other methods of organizing graphic layers and handling "fall through" will be apparent to those of skill in the art. Preferably, however, the graphic controls layers will be arranged so that the user input action will occur over the opaque region of at least one graphic control layer.

In addition, the graphic control elements of the present invention may include layers depicting the graphic controls of the graphic control elements in both active and inactive states. Generally, the inactive state of a graphic control element is displayed initially. However, it will be appreciated that the active state may be displayed initially if the control's default state is the activated state. In a preferred embodiment, when a user input action reaches the opaque region of a graphic control layer, in addition to generating a system message corresponding to the "activation" of that layer the initial graphic control layer depicting the inactive state of the control is hidden and a graphic control layer depicting the active state is revealed.

Figure 3B:
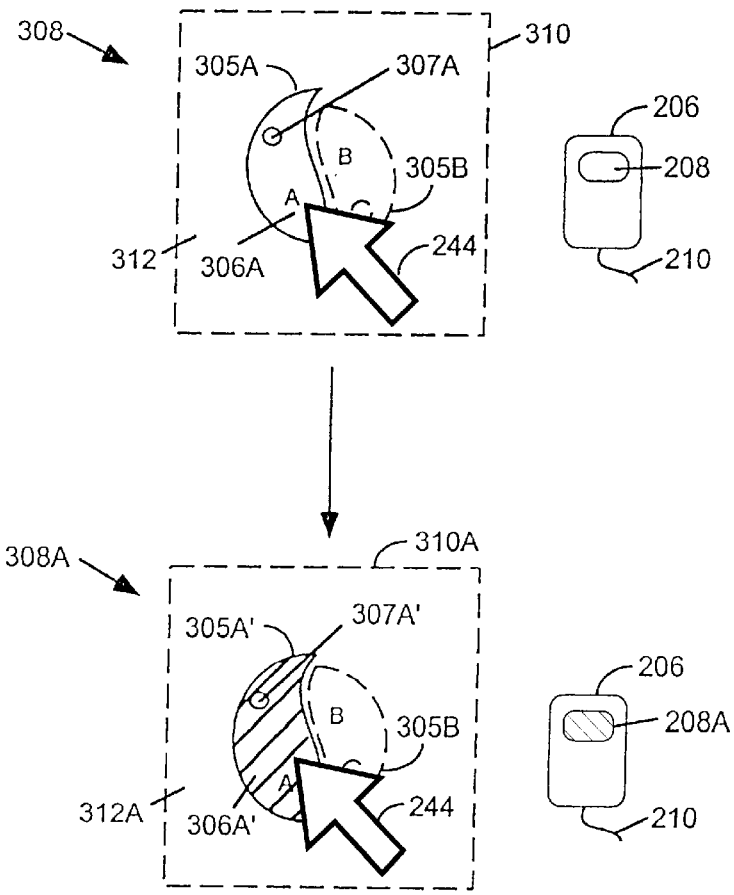

As shown in FIG. 3B, for example, button 305A is shown in a unpressed or inactive state. Cursor 244 has been placed over opaque region 306A by the motion of mouse 206. Upon depressing the mouse button so that the mouse button is in depressed state 208A, graphic control layer 308 is hidden and replaced by graphic control layer 308A which includes a new button 305A', having opaque region 306A' and transparent region 307A' indicating that button 305A has been "depressed" by the action of depressing mouse button 208, a new bounding box 310A, and a new transparent region 312A. New button image 305A, new bounding box 310A, and new transparent region 312A may be coextensive with, or different from, the corresponding regions of graphic layer 308.

Figure 3C:
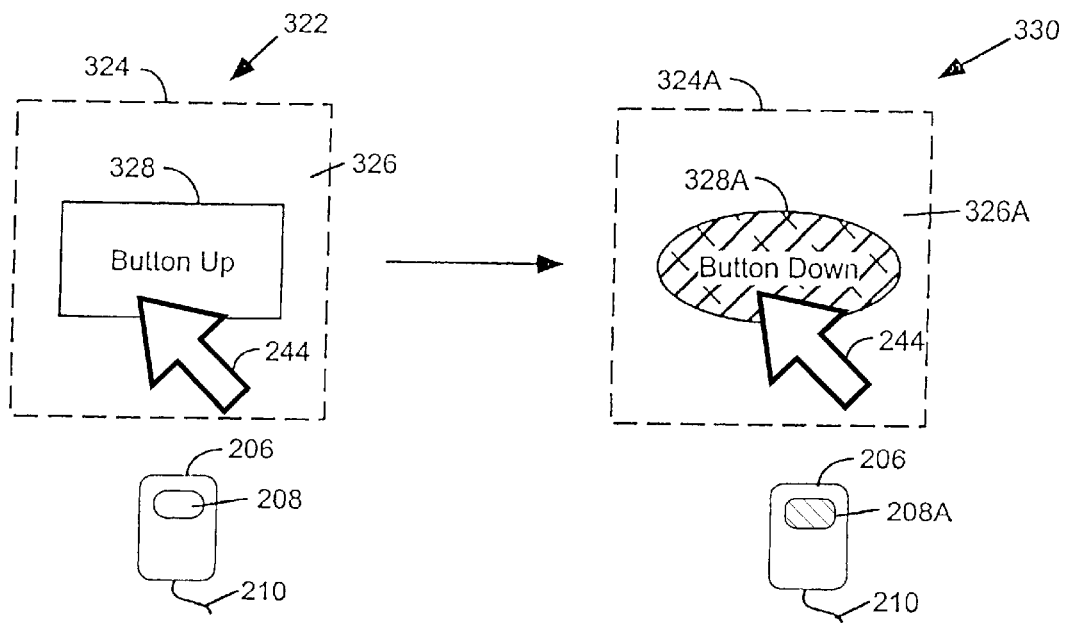

An illustration of a graphic layer depicting the activated state of the control in a shape which is different from the shape of the control in the inactive state as illustrated in FIG. 3C. There, graphic control layer 322, including bounding box 324, transparent region 326 and rectangular button 328 depicts an unpressed state, as shown by the corresponding mouse 206 with unpressed mouse button 208. Upon activation by selecting the button 328 with cursor 244 and depressing mouse button 208 as shown at 208A, the graphic control layer depicting the inactive state is replaced by a second graphic layer 330 having a bounding region 324A, transparent region 326A and opaque region 328A indicating the depressed state. The depressed button state shown, however, has a different appearance from the unpressed button 328. Thus, graphic control elements of the invention generally can comprise at least two graphic control layers, one layer indicating an unpressed or inactive state and a second layer indicating a depressed or active state, in which the appearances of the active and inactive states are very different. It will be appreciated that the capability for displaying active and inactive button images having different appearances increases the utility of the graphical user interface by providing the user with the state of a button (active or inactive) efficiently.

From the foregoing as described with respect to FIGS. 3A–3C, it will be appreciated that the present invention provides complex graphical user interface controls having stacked, multiple graphical control layers, each layer having a control of arbitrary dimension and shape. In addition, by providing for discrimination between user input actions over opaque regions of a graphical control layer which are trapped and processed, versus user input actions over a transparent region of the graphical control layer which are passed to another graphical control layer, highly complex control elements can be constructed having two, three, four or more controls that can be arranged in a mosaic to represent complex objects, such as aircraft, anatomical figures, buildings, and the like, in a highly intuitive form to the user.

Figure 4:
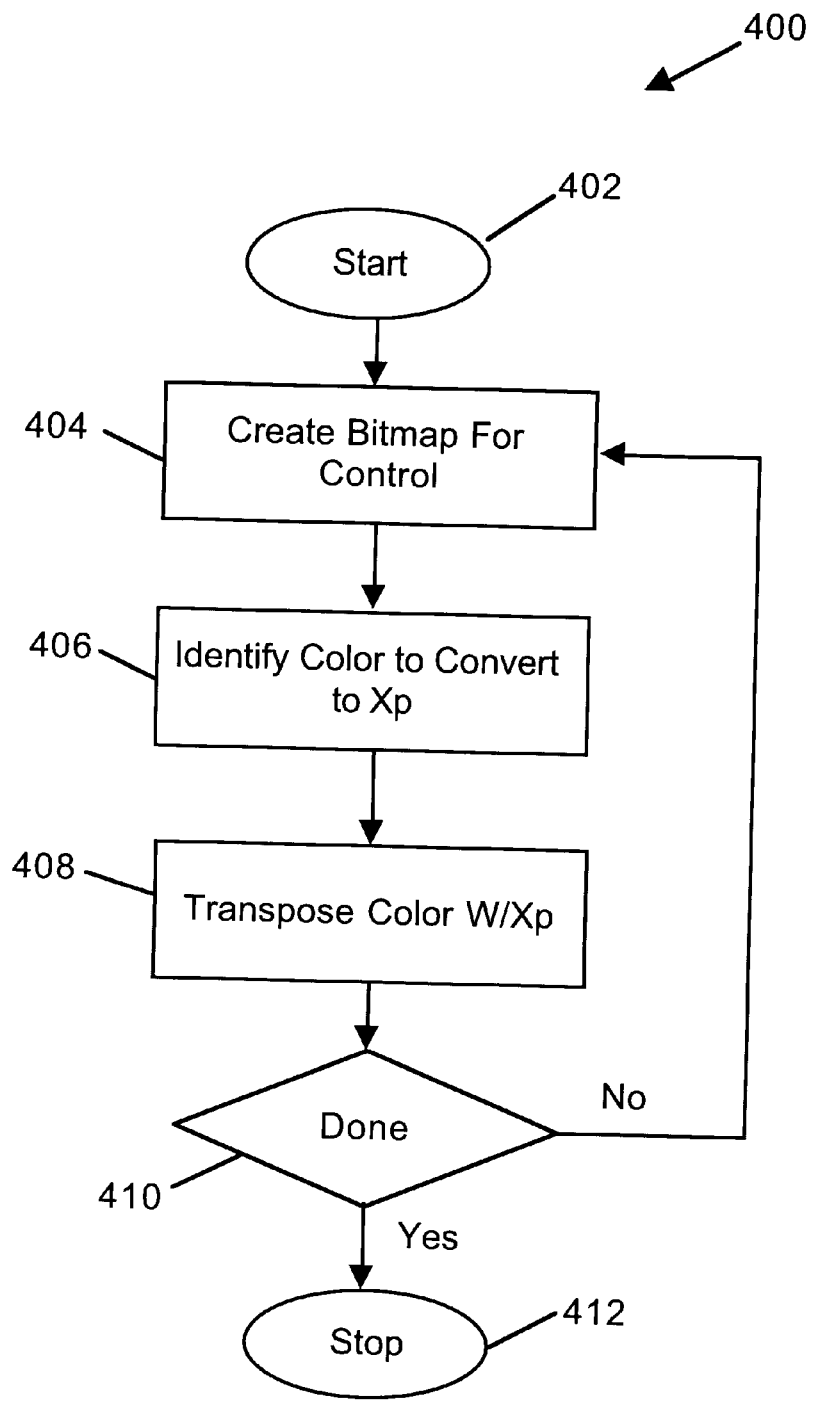
FIG. 4 is a flow diagram illustrating the creation of a graphic control layer of the present invention.

The formation of graphic control elements is outlined in FIG. 4 at 400. Beginning with step 402, a bitmap or vector graphic depicting the control of the graphic control layer is created at step 404 using any software effective for the generation of bitmap and vector graphic objects. Once the graphics for the control are created, preferably using different colors for the opaque and transparent regions, at step 406 one color is identified and converted to transparent (Xp), again using standard methods known in the art for the construction of graphics. At step 408 the color identified as defining the transparent region is transposed with the transparent attribute. At step 410, a determination is made as to whether other graphics are to be created. If additional graphic control layers are to be created, control moves back to step 404 for the transposition of transparency and color bit values for each of the additional layers. Otherwise, the procedure ends at step 412. Generally two depictions are made, one for the active state and one for the inactive state. It will be appreciated by those of skill in the art that only bitmap graphics can be defined as opaque or transparent, and that the analogous definitions for vector graphics are opaque and clear. For the sake of clarity, the graphic control layers of the present invention will be described with respect to bitmapped objects; however, those of skill in the art will appreciate that the descriptions can be carried over to vector graphic objects using well known and standard methods.

Figure 5:
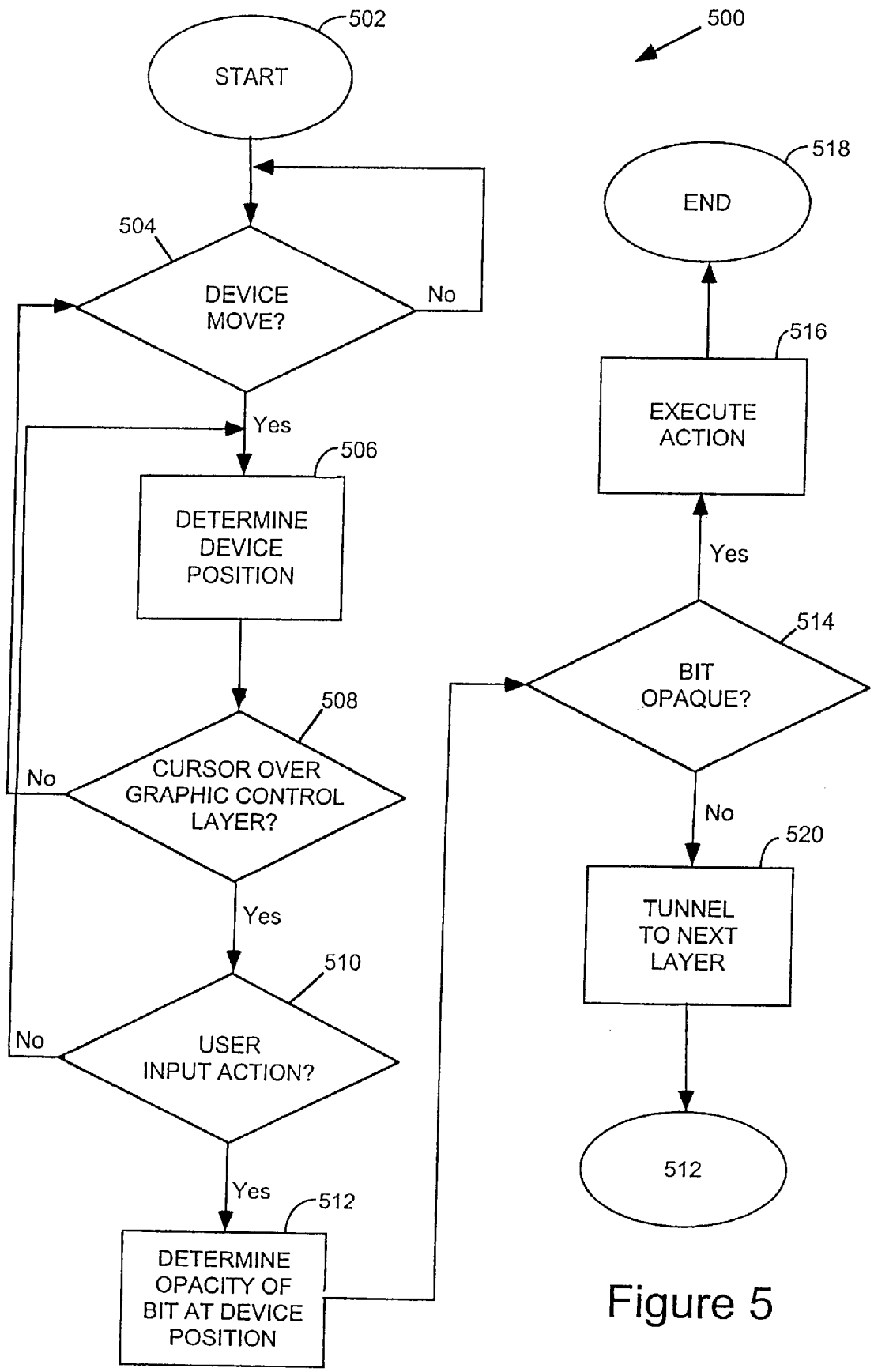
FIG. 5 is a flow diagram illustrating the method of the invention.

The present invention also includes a method for controlling a computer using a graphic interface having graphic control elements such as those described above. As illustrated in FIG. 5 at 500, the method of the invention begins at step 502. The system waits at step 504 until motion of the pointer device, e.g. movement of a mouse, is detected; then a determination of the mouse position is made at step 506 and, at step 508, a determination is made as to whether the pointing device is over a graphic control element. If the pointing device is not over a graphic control element, then the system waits until motion of the pointing device is detected back at step 504.

If the pointing device is determined to be located over a graphic control element, then the system at step 510 determines whether a user input action has been initiated. If not, the method loops back to step 506 to again determine the device position. Otherwise, upon detection of a user input action at step 510, a determination of the opacity of the graphic control layer at the device position is made at step 512, and, at step 514, a determination is made as to whether the pixel at the position of the device is opaque. Alternatively, if the graphic is a vector graphic object a determination is made as to whether the vector graphic element of the device position is opaque. If the graphic element is determined to be opaque at step 514, then, at step 516, the appropriate action is executed by the software operating on the CPU and the procedure terminates at step 518.

However, if the pointing device is determined to be over a transparent region then at step 514 the user input action is "tunneled" to the next graphic control layer at step 520 and control loops back to step 512, at which point a determination is made to opacity of the pixel or graphic element at the new graphic layer. It will be appreciated by those of skill in the art that the methods necessary for detecting the motion of the pointing device, determining the opacity of pixels or vector graphic objects and the determination of the position of the input device are all well known to those of skill in the art.

Figure 6:
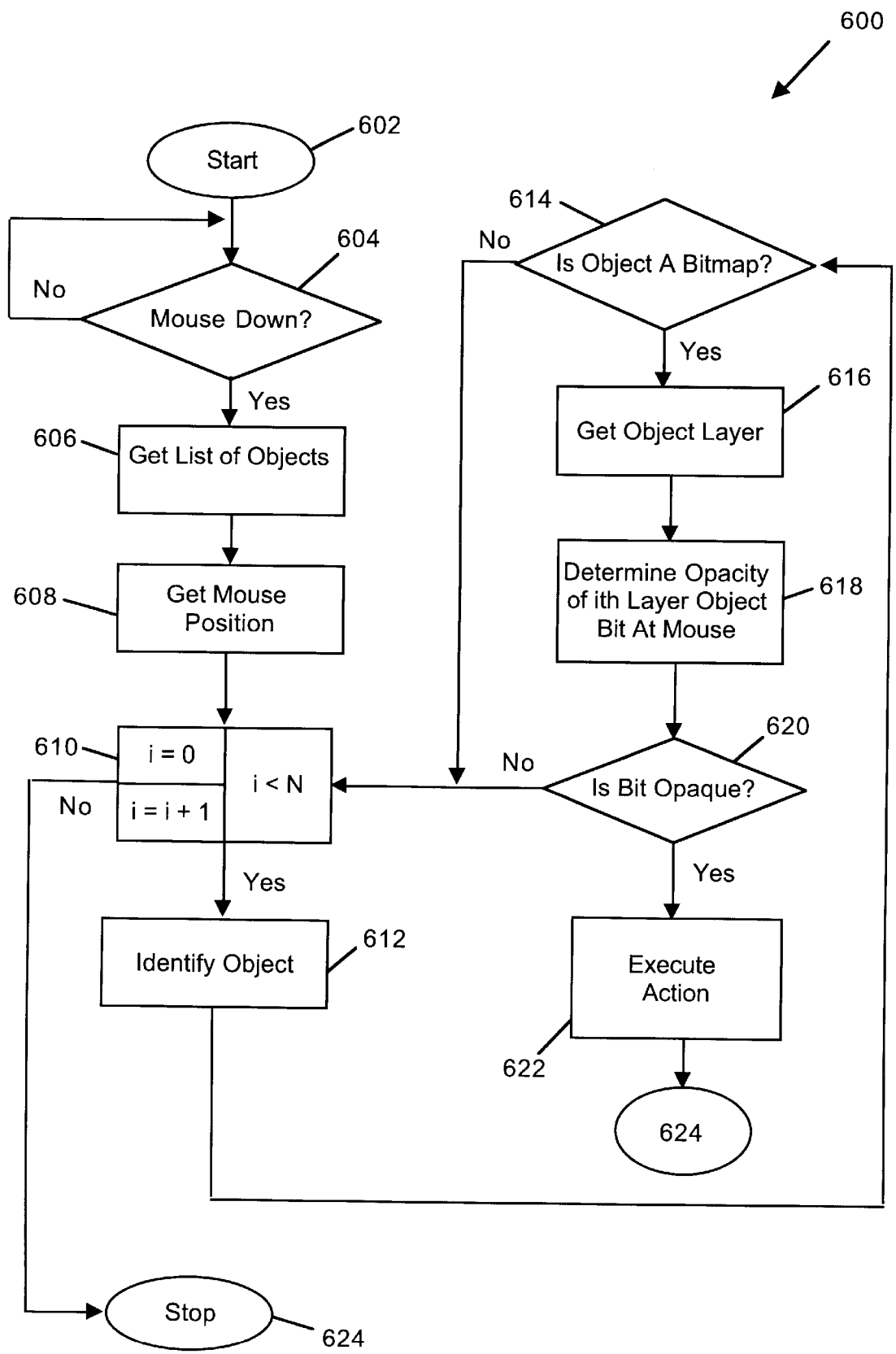
FIG. 6 is a flow diagram illustrating the method as shown in FIG. 5, but further illustrating tunneling between graphic control layers.

A more detailed description of the method of the invention, and especially the above-described tunneling, is provided in FIG. 6 at 600. Beginning at step 602, the process waits at step 604 until a user action (e.g., a mouse down event) has been detected by the system. When a user action is detected, a list of the graphic objects comprising the graphic control elements available to the user is obtained from the system at step 606, and, at step 608, the position of the user input device is obtained.

At step 610 the user input action is processed for the $i^{th}$ graphical control layer of the N total graphical control layers that comprise the graphical control. Starting at the top-most graphical control layer (i=0) the object that comprises the layer is identified at step 612. If the object is determined to be a bitmap at step 614, the layer is retrieved at step 616 and the opacity at the bit (or pixel) at the mouse location is determined at step 618. If the bit is determined to be opaque at step 620, the action associated with the current graphical control element is executed at step 622 and the procedure terminates at step 624. If, however, the object is determined to be something other than a bitmap at step 614, then the loop index is incremented and the above-described steps are executed for the next graphical control layer.

Similarly, if the object is a bitmap, but the mouse position is determined to be over a nonopaque (i.e., transparent) bit at step 620, the loop index is incremented and the next graphical control layer examined as described above. The sequence of steps 616, 618 and 620 will be referred to herein as "tunneling", i.e., the process by which the user input action is transferred from one layer to another in response to a determination that the user input device is located over a transparent bit at its current layer.

If the object is a vector graphic, then a sequence similar to steps 618–626 is followed but the a determination is made as to whether the object at the mouse position of the layer is clear or opaque. In either case, after determining that the user input device is located over an opaque graphic object, the execution associated with selecting that object is initiated at 624 and the procedure is concluded at step 626. It will be appreciated by those of skill in the art that the steps of determining mouse down events, obtaining object lists, obtaining mouse positions and object identities and layers can be implemented using techniques standard in the art.

In a preferred embodiment the graphical control elements of the present invention support "backout" behavior of the pointer device. By "backout" behavior it is meant herein that upon initiating a user input action over the opaque region of a graphic control layer, relocation of the user input device to a region outside the opaque region while performing input action does not trigger the above described tunneling behavior, but rather changes the state of the graphic control layer from active to inactive. If the user input device is located over the opaque region subsequently during the user input action, the graphic control layer changes its display from an inactive display to an active display.

For example, during backout behavior activation of a push button (i.e., placing a cursor over the button control using a mouse or other pointing device and initiating a user input action, such as depressing the mouse button) causes the removal of the inactive push button layer and the display of the activated push button layer. Subsequent translation of the cursor outside of the button region while the mouse button remains depressed causes the active button layer to be hidden and the inactive button layer to be displayed, but the mouse action continues to remain at the graphic layer of the push button. In other words, the user input action is not transferred to a lower graphic layer even though the cursor has moved from an opaque region of the graphic control layer to a transparent region of the graphic control layer.

Figure 7:
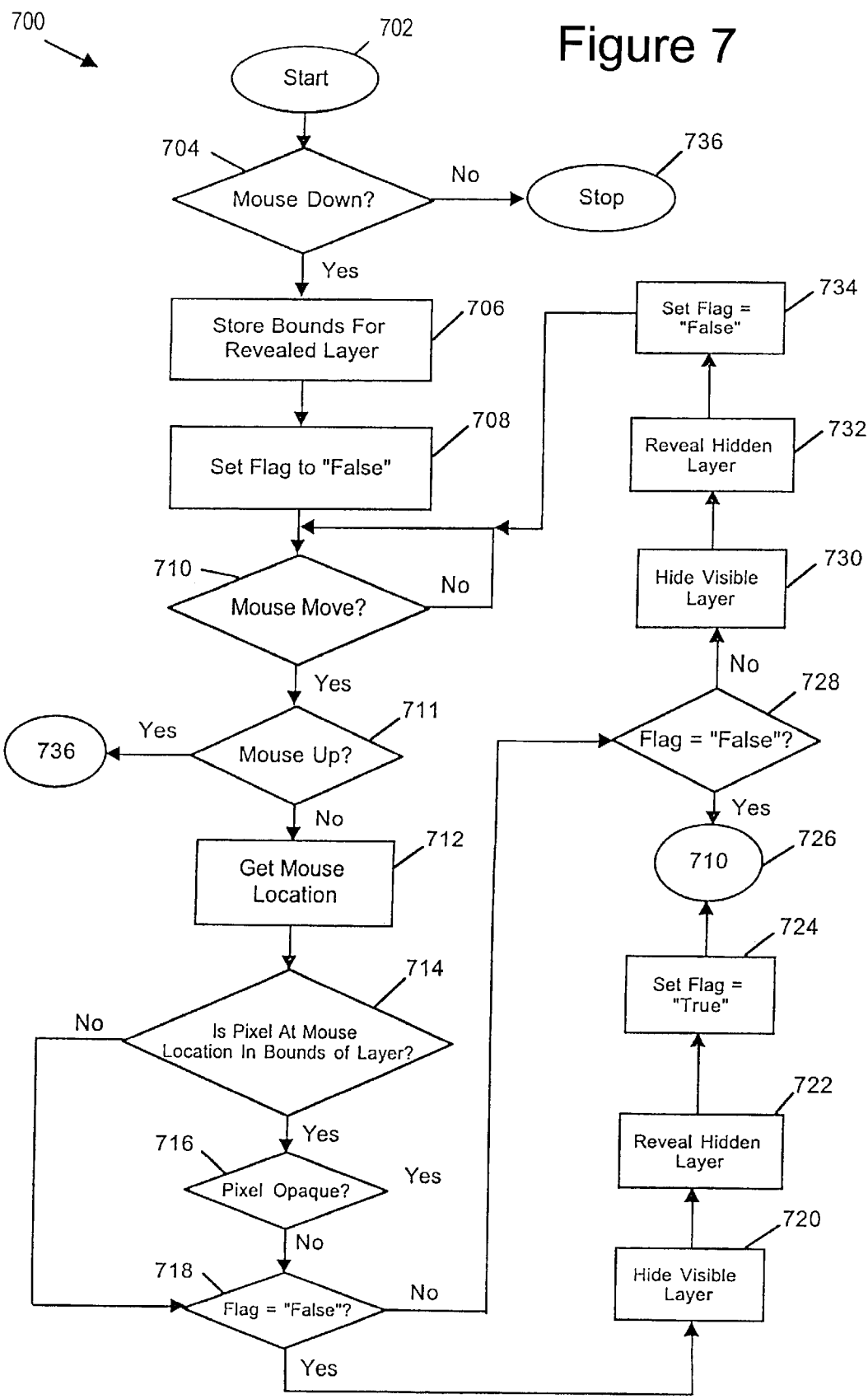
FIG. 7 is a flow diagram illustrating the backout behavior.

A method for providing backout behavior with the present invention is illustrated in FIG. 7 at 700. Beginning initially at step 702, a determination is made as to whether a user input action has been initiated, e.g., a mouse down event has been received, at step 704. If the user input action has been initiated then, at step 706, the bounds for the revealed layer, i.e., the layer at which the user input action has been intercepted after any tunneling, are retrieved at step 706, and, at step 708, a backout flag is set to false. At step 710 the system waits for movement of the user input device, and, at step 711, a check is made as to whether the input action has ceased (e.g., the mouse button has been released). If the input action has ceased, the procedure terminates at step 736; otherwise, at step 712 the new location of the device is obtained and, at step 714, a determination is made as to whether the pixel at the new user input device position remains within the bounds of the graphic control layer.

If the answer at step 714 is that the pixel at the mouse position remains within the graphic control layer, then, at step 716, a determination is made as to whether that pixel is opaque. If the pixel is not opaque, then a determination is made at step 718 as to whether the flag is in the "false" state. If the flag is not in the "false" state, then, at step 726, control returns back to step 710. If the flag is "false", then, at step 720, the visible layer is hidden followed at step 722 by the display of the hidden layer. In other words, the display of the graphic control element moves from an activated display to an inactive display. At step 724 the flag is set to the "true" condition and control returns to step 710.

Alternatively, if at step 716 the pixel is determined to be opaque, then, at step 728, a determination is made as to whether the flag is set to "false". If the flag is "false", control moves to step 710 at step 726. Otherwise, the visible layer is hidden at step 730, the hidden layer is rendered visible at step 732 and the flag is set to "false" at step 734. Control then returns to step 710. In this case it has been determined that the user input device has not moved outside of the opaque region of the graphic control layer; therefore, there is no need to change the display of the graphic control layer. If, however, at step 714 a determination is made that the pixel at the mouse location is no longer within the bounds of the graphic control layer, control moves to step 718 as described above. Finally, if at step 704 the input action ceases, e.g., the mouse button is released, the procedure terminates at step 736.

Figure 8:
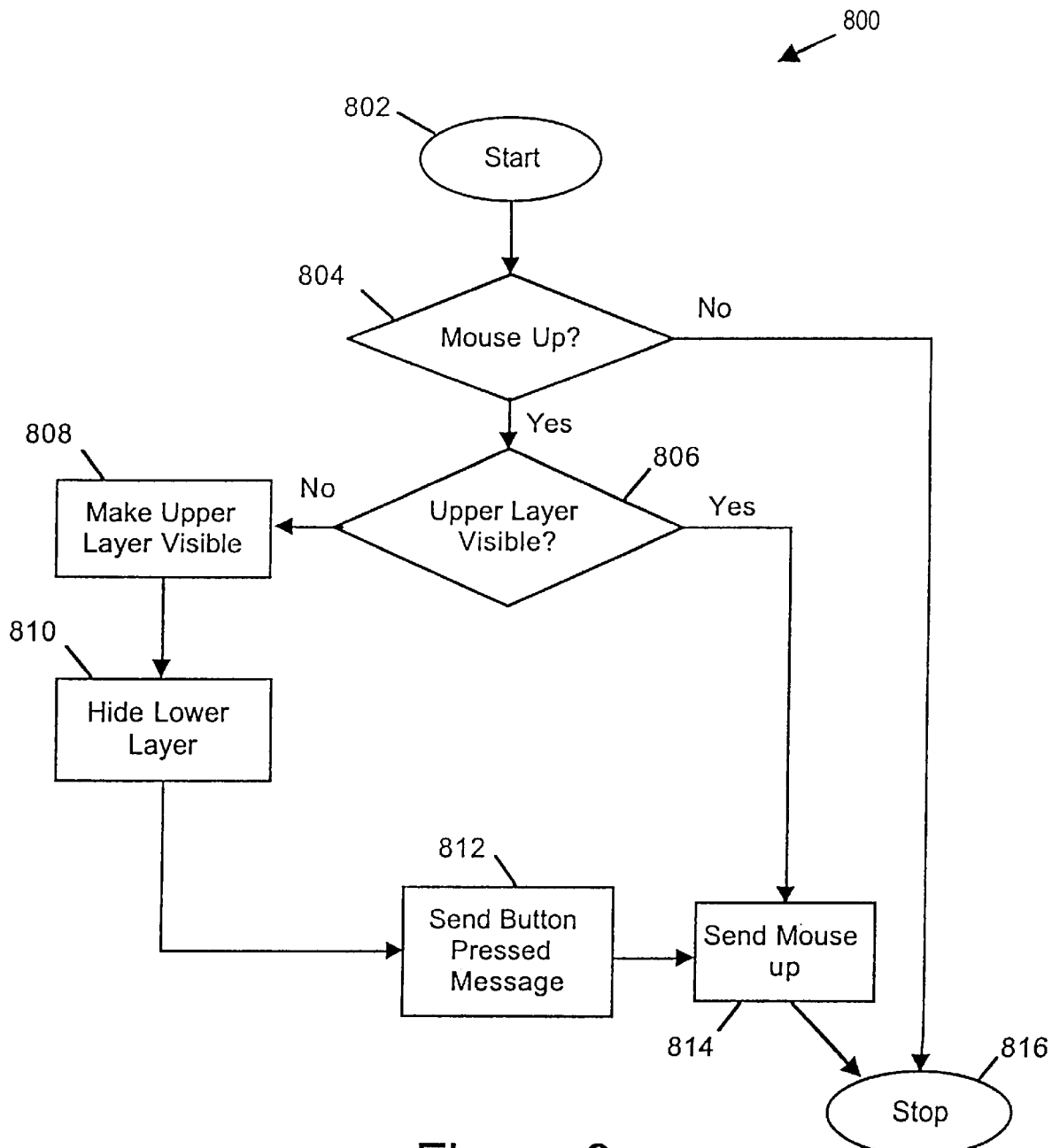
FIG. 8 is a flow diagram illustrating the operation of a push button in accordance with the present invention.

The operation of a graphic control element corresponding to a push button or radio button is described with respect to FIG. 8 at 800. Beginning initially at step 802 a determination is made as to whether a user input action has been completed at step 804, e.g., whether a mouse up event has been received from the system. If no mouse up event is received, then backout behavior is initiated as described above with respect to FIG. 7 and the procedure terminates at step 816. If the user input action has been completed, then a determination is made as to whether the upper layer, corresponding to an unpressed button, is visible at step 806. If the upper layer is not visible, then at step 808 the upper layer is made visible and at step 810 the lower or depressed state layer is hidden at step 810. Following the display of the unpressed button state a "button pressed" message is sent by the system at step 812, followed by an indication from the system that a user input action has been completed, e.g., that a mouse up event has occurred, at step 814. The procedure terminates at step 816. If the upper layer is already visible, the mouse up message is sent at step 814 and the procedure terminates at step 816.

Figure 9:
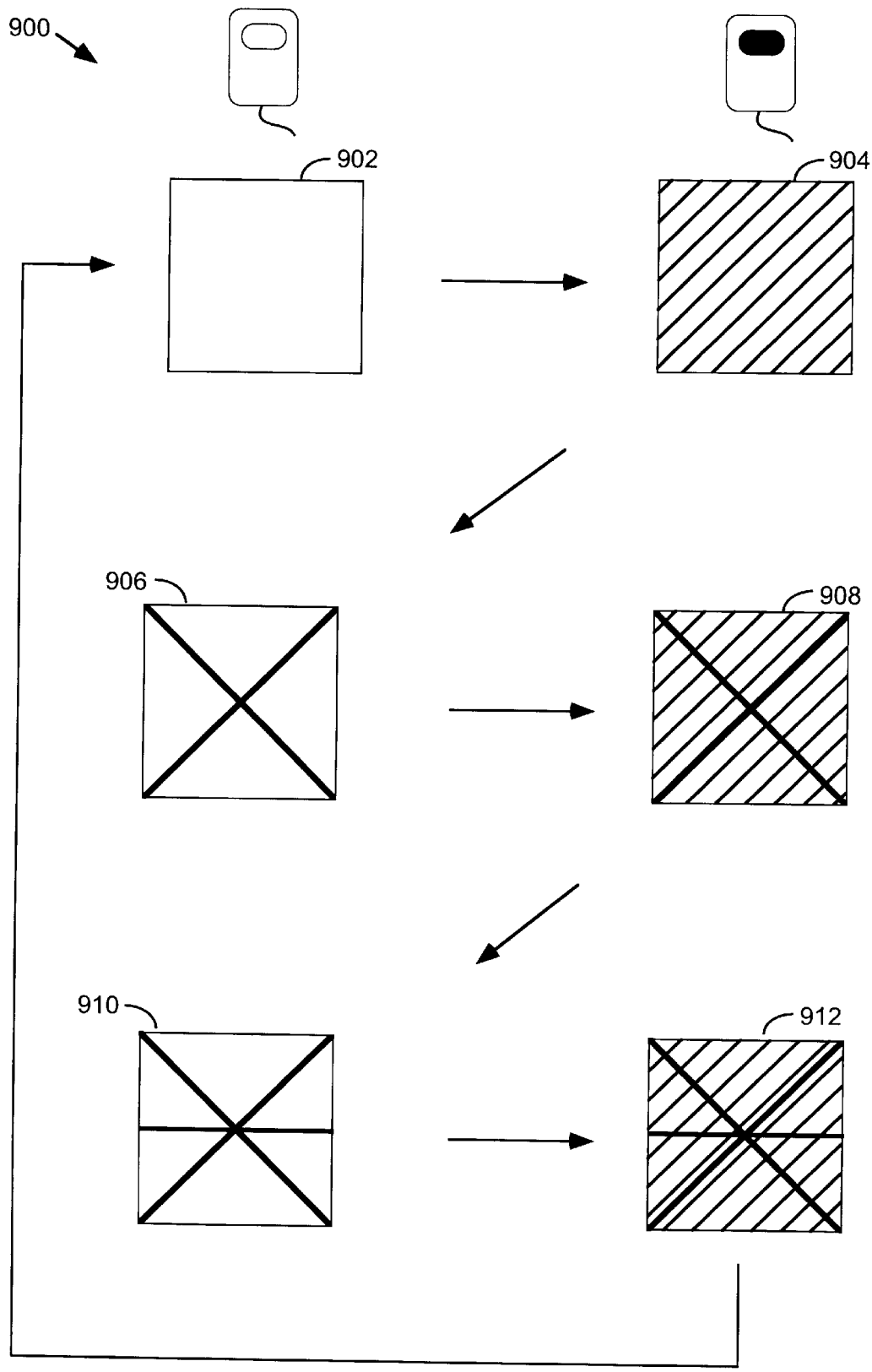
FIG. 9 illustrates a graphic control check box in accordance with the present invention.

In another aspect the present invention includes support for check boxes such as those shown at 900 in FIG. 9. As will be familiar to those of skill in the art, check boxes allow a user to set an option to either an "on" or "off" state. For example, a check box may appear next to a parameter setting such as "always put sugar in my coffee." Check boxes differ from radio buttons as multiple check boxes may be active in a list of parameter settings, in contrast to radio buttons which generally allow only one radio button to be active in a list of radio buttons.

A check box graphic control element is illustrated at FIG. 9 at 900. As shown in the Figure, in a preferred embodiment, the check box graphic control element of the present invention comprises several graphic control layers indicating inactive (e.g., mouse up) and active (e.g., mouse down) states in addition to multiple input states. Each state corresponds to a specific parameter setting. Thus, beginning at an unchecked, unpressed inactive state 902, a response to a user input action (e.g., mouse down) causes display of a depressed but unchecked state 904. Cessation of the input action causes the depressed appearance to be replaced by an unpressed, checked state 906. A third user input action causes the checked box to remain, but displayed as a depressed state 908. Receipt of still another user input action removes the depressed appearance from the box but adds a second checked appearance as shown in 910. Yet another input user action causes the twice checked box 910 to further include a depressed appearance as shown in 912. In a preferred embodiment receipt of still another user input action cycles the display back to unchecked, unpressed appearance 902. It will be appreciated by those of skill in the art that additional check box graphics may be added following the user input action on a button in the state shown at 912 in FIG. 9, e.g., a vertical line may be added to show a third unpressed checked box. Alternatively, fewer states may be displayed. Generally, the number of layers will correspond to the number of options available to the user. In addition, those with skill will also appreciate that the boxes described above may include text, graphics or a combination of text and graphics and that the depressed states may vary.

Figure 10:
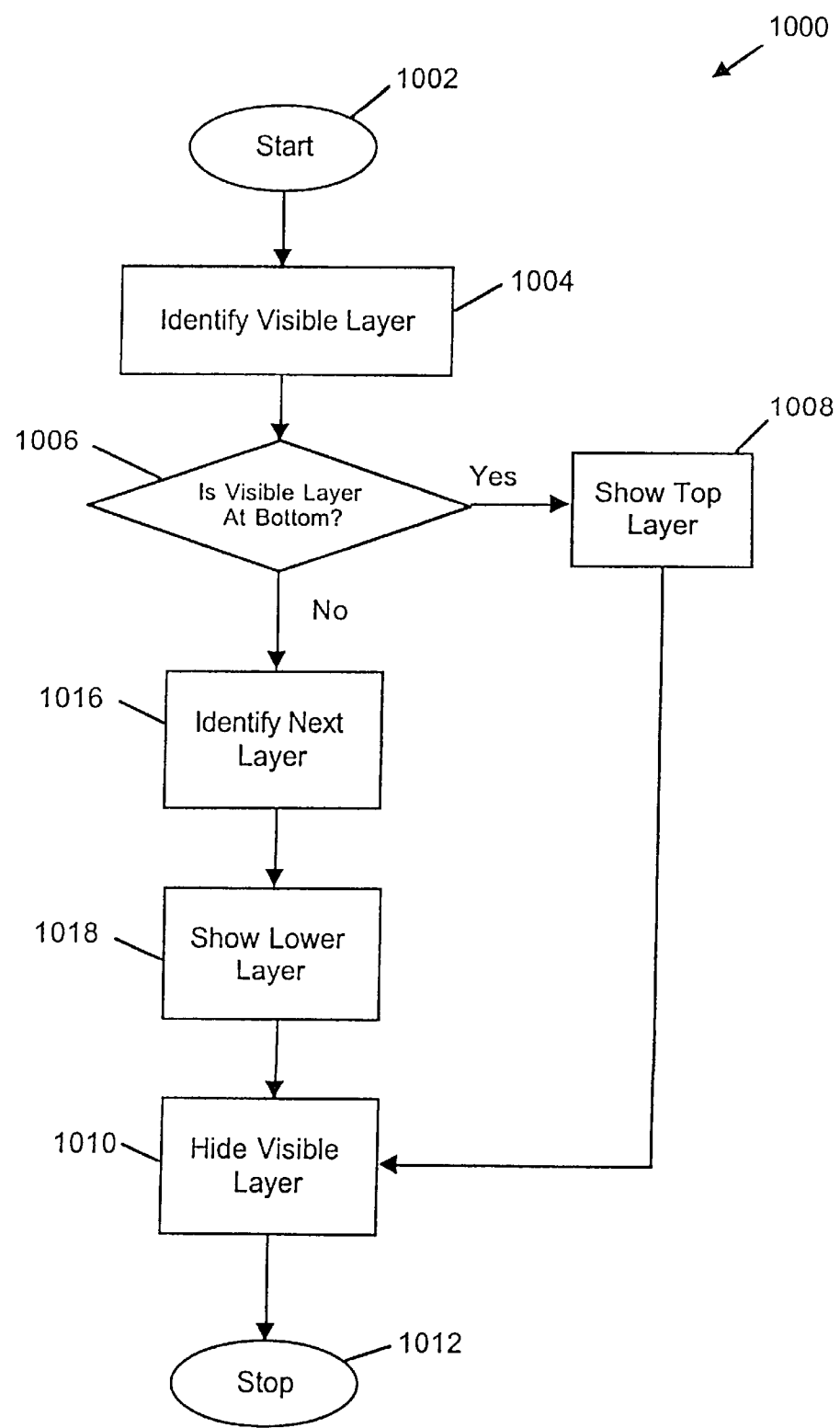
FIG. 10 is a flow diagram illustrating the operation of a check box of FIG. 9.

The operation of the checked box as shown in FIG. 9 follows the procedure outlined at 1000 in FIG. 10. Beginning at step 1002, the visible layer is identified at step 1004 and, at step 1006, a determination is made as to whether the displayed layer is at the bottom of the graphic control layers that comprise the graphic control element check box. If the bottom layer has been reached, then at step 1008 the top layer is displayed and, at step 1010, the bottom layer is hidden. Alternatively, if at step 1006 the current graphic control area is not at the bottom of the stack of graphic control layers, then at step 1016 the next graphic control layer is identified and, at, step 1018, that next lower layer is displayed and control then passes to above described step 1010.

Figure 11A:
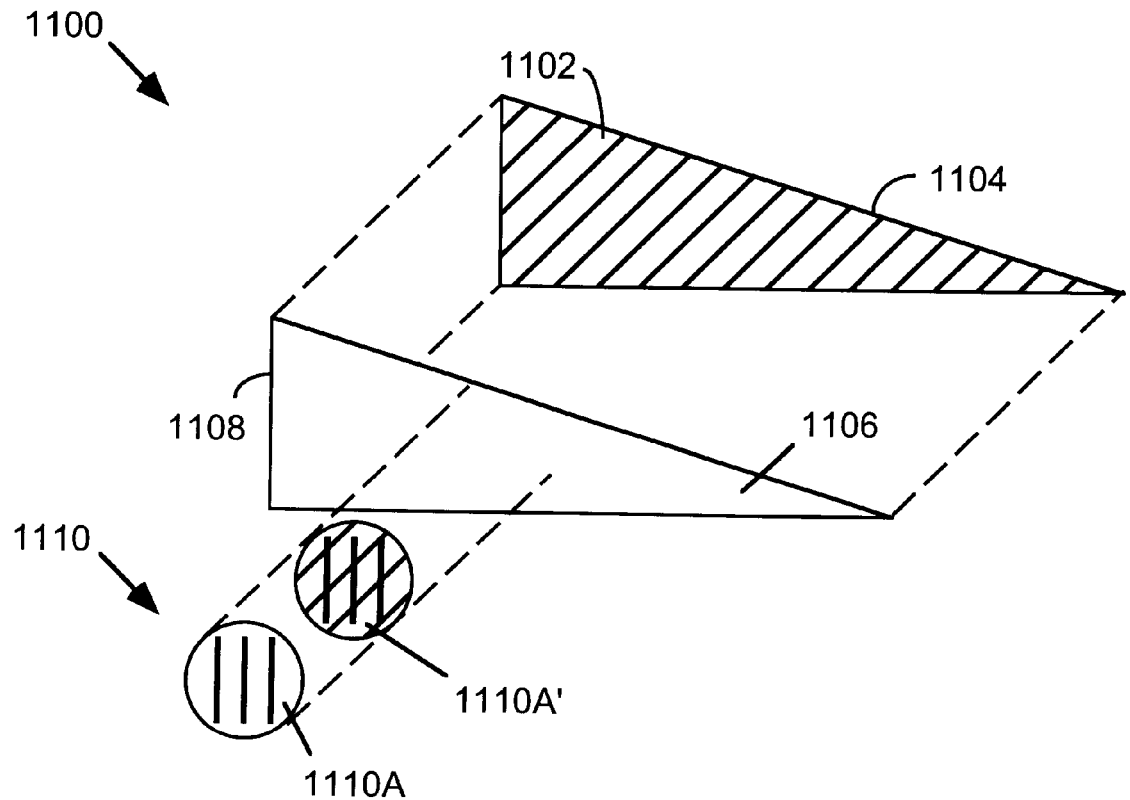
FIGS. 11A and 11B are illustrations of a graphic control slider in accordance with the present invention.

In still another aspect the present invention includes graphic control elements that correspond to sliders such as that shown at 224 in FIG. 2. As will be apparent to those of skill in the art, sliders are graphic user interface devices that allow a user to select the variable over a quasi-continuous range of settings, by analogy to setting a temperature using a thermostat. An example of a graphic control element corresponding to a slider in accordance with the present invention is illustrated at 1100 in FIG. 11A. There, the slider of the invention includes three elements: (1) a lower slider portion 1102 having a lower slider perimeter 1104; (2) an upper slider portion 1106 having an upper slider perimeter 1108; and (3) a slider thumb 1110 having a first layer corresponding to an undepressed state 1110A and, optionally, a second layer corresponding to a depressed state 1110A'. Each of the above described slider portions comprises a separate graphic control layer; the superposition of the graphic control layers providing the graphic control element that corresponds to the slider. Lower slider portion 1102 is illustrated to be arranged beneath upper slider portion 1106 (dashed lines) and slider thumb layers 1110A and 1110A' are arranged in above the layer corresponding to upper slider portion 1106. These elements further include bounding boxes as described above that are not shown.

Figure 11B:
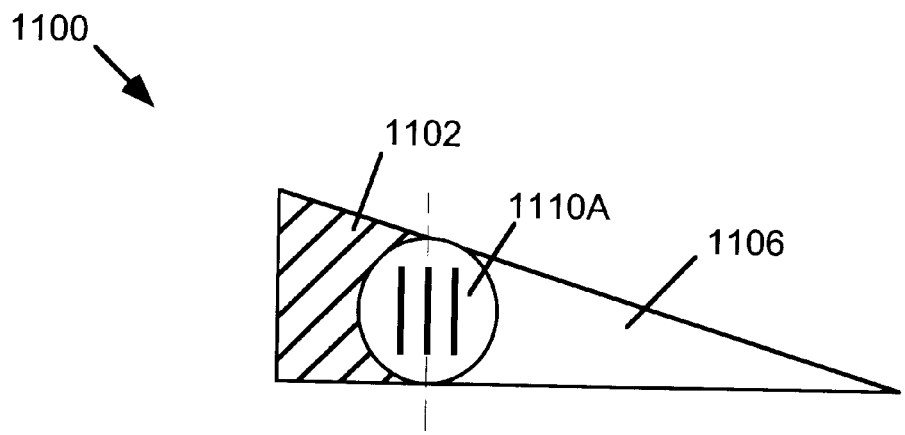

The screen appearance is illustrated FIG. 11B, where the lower slider portion corresponds to the area left of slider thumb 1110A. The upper slider portion corresponds to the area to the right of the slider thumb. Preferably, the lower slider includes a color or pattern which is easily distinguished from the upper slider portion. Thus, it will be appreciated that the slider graphic control element of the invention provides users with a more intuitive visual representation of the state of the control as the user can determine the setting by simply comparing the relative areas of the upper and lower slider portions. It will also be appreciated that the upper and lower slider graphics and the slider thumb can be shapes other than the rectangular shapes illustrated.

As will be appreciated from the foregoing discussion with respect to FIGS. 3A–3C, the upper and lower portion of the slider, as well as the slide thumb, can comprise any shape and dimension. Thus, the present invention provides sliders having upper and lower portions and slider controls that independently are e.g., oval, rhombic, triangular or circular in shape. In addition, the upper and lower slider portions, and the slider thumb layers, can comprise different colors and patterns. This, also as noted above, provides for the construction of more intuitive and informative graphical control elements than heretofore available. Also, using multiple layers corresponding to several slider controls, mosaics of sliders can be constructed e.g., to allow multiple slider controls in a limited area of space.

Figure 12:
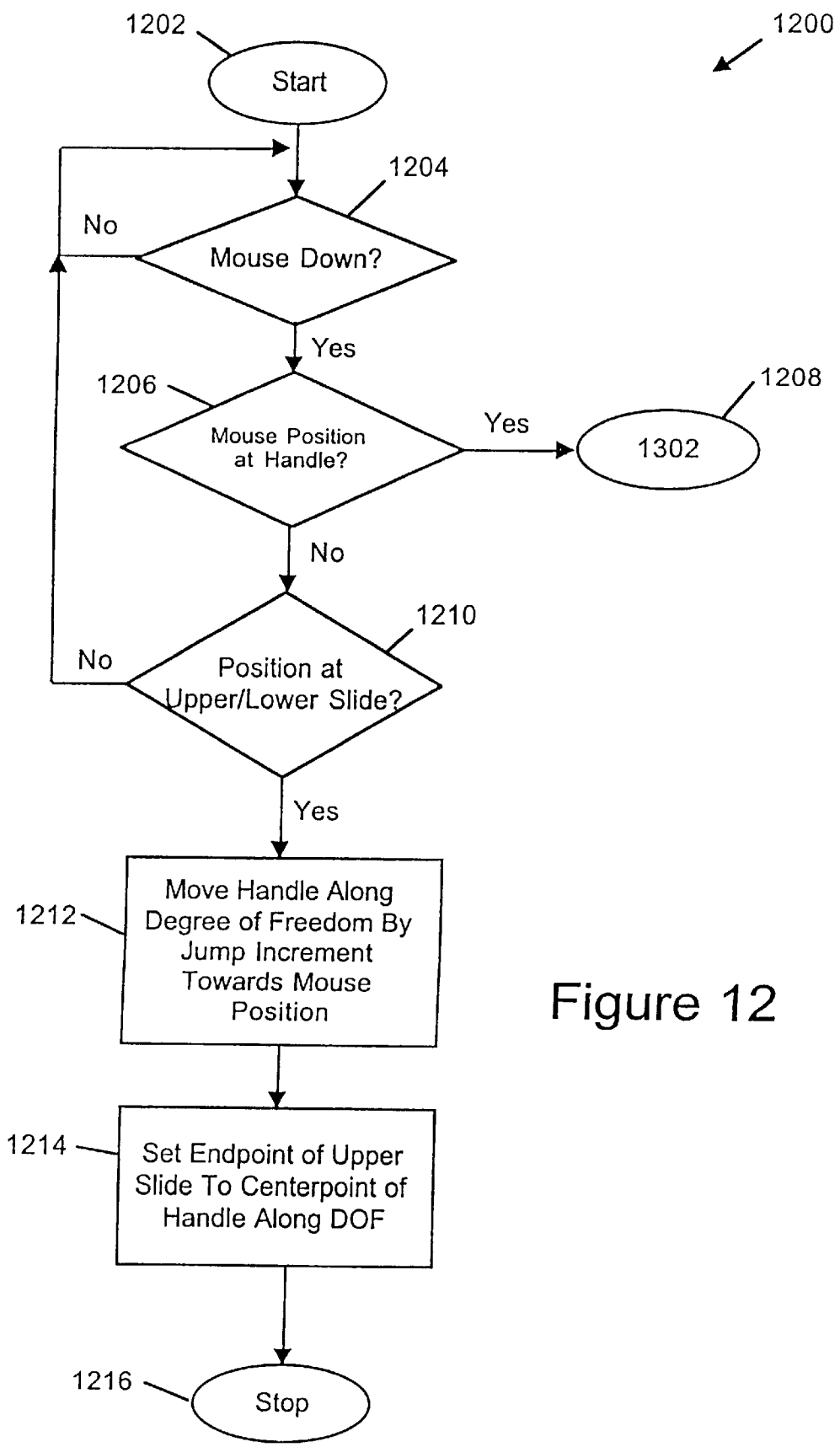
FIG. 12 is a flow diagram illustrating the motion of a slider control thumb as illustrated in FIG. 11.

The operation of the slider of the present invention is described with respect to FIG. 12 at 1200. Beginning at step 1202, the system waits for a user input action (e.g., a mouse down event) at step 1204. When a user input action is received, at step 1206 a determination is made as to whether the input action occurred at the slider thumb of the slider. If the query at step 1206 returns an affirmative answer, then, at step 1208, control moves to step 1302 which is described below. If the user input action has not occurred over the slider thumb, then a determination is made as to whether the user input action occurred within one of either the upper or lower slides of the slider at step 1210. If the query at step 1210 returns a negative answer, then control moves back to step 1204 as the user input action has not occurred over any functional portion of the slider.

However, if the user input action occurs over either the upper or lower portion of the slider, then, at step 1212 the slider thumb is moved along the degree of freedom defined by the long axis of the slider by a jump increment of preset magnitude to the mouse position. The jump increment can be set, for example, by the programmer or determined automatically from other parameters. At step 1214, the end point of the upper slider portion is set to the center point of the slider thumb along the degree of freedom thus revealing the lower slider portion to the user. The procedure terminates at step 1216.

Figure 13:
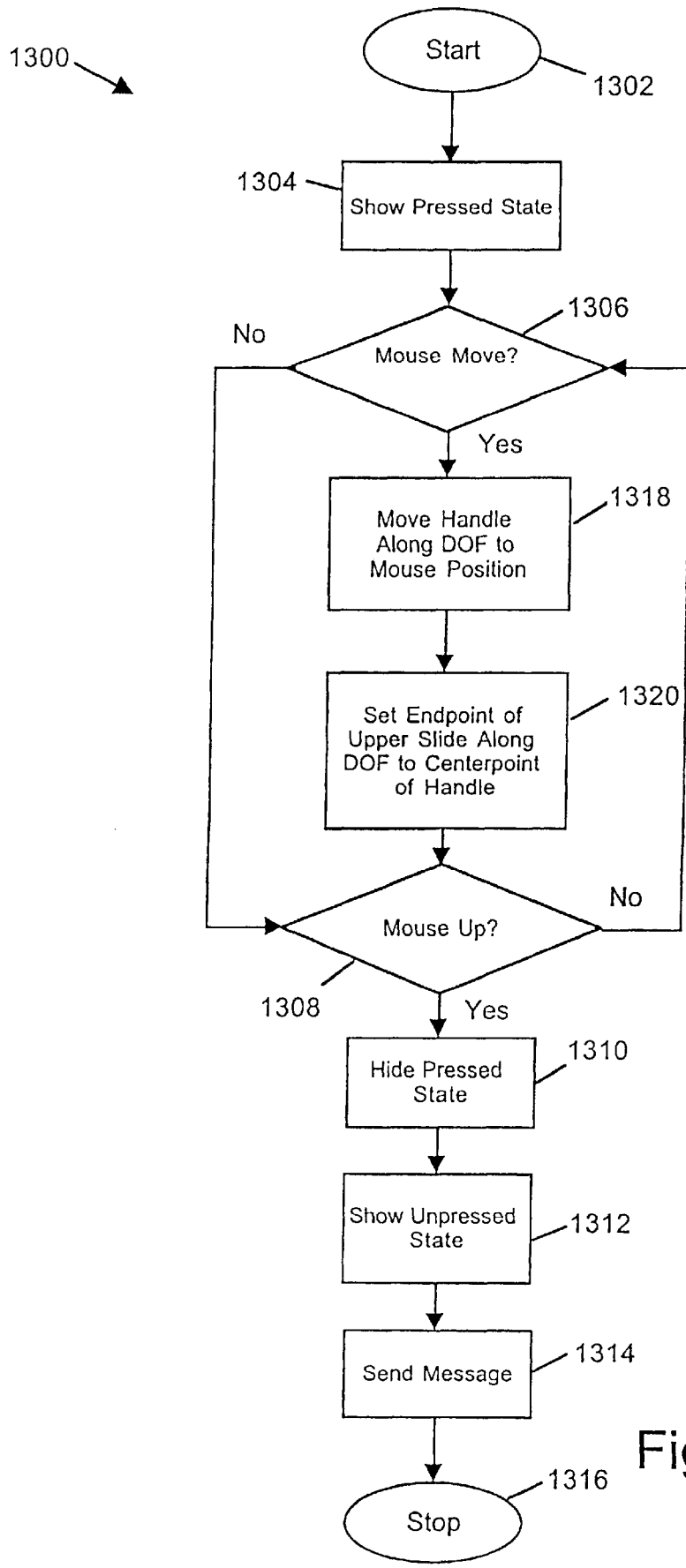
FIG. 13 is a flow diagram illustrating motion of a slider thumb by user input actions along the upper or lower slider portions of the slider of FIG. 11.

If at step 1206 the user input device is located at the slider thumb then the procedure described in FIG. 13 at 1300 is followed in contrast to the procedure described above with respect to FIG. 12. Beginning at step 1302, the graphic layer corresponding to the pressed state of the slider thumb is displayed at 1304 and, at step 1306, a determination is made as to whether the user input device has moved. If the device has not moved then, at step 1308, a determination is made as to whether a user input action has been completed (e.g., a mouse up signal has been received). If an user input action has not been completed, then control returns to step 1306.

If a user input action has been completed, then the graphical layer corresponding to the pressed state of the slider thumb is hidden at step 1310, and the graphic control layer corresponding to the unpressed slider thumb is displayed at step 1312. A system message is then sent at step 1314 to indicate that a user input action has occurred and at step 1316 the sequence terminates. As noted above, the inclusion of a depressed slider thumb is optional. Thus, it will be appreciated that steps 1304, 1310 and 1312 will not be included in those embodiments lacking a depressed slider thumb.

Referring back to step 1306, if motion of the user input device detected, then at step 1318 the slider thumb is moved along the degree of freedom (DOF) defined by the long axis of the slider to the position of the user input device. At step 1320 the end point of the upper slider region along the degree of freedom is set to correspond to the center point of the slider thumb thus showing the user the relative movement along the slider. The control then moves to step 1308, which step is described above.

Figure 14A:
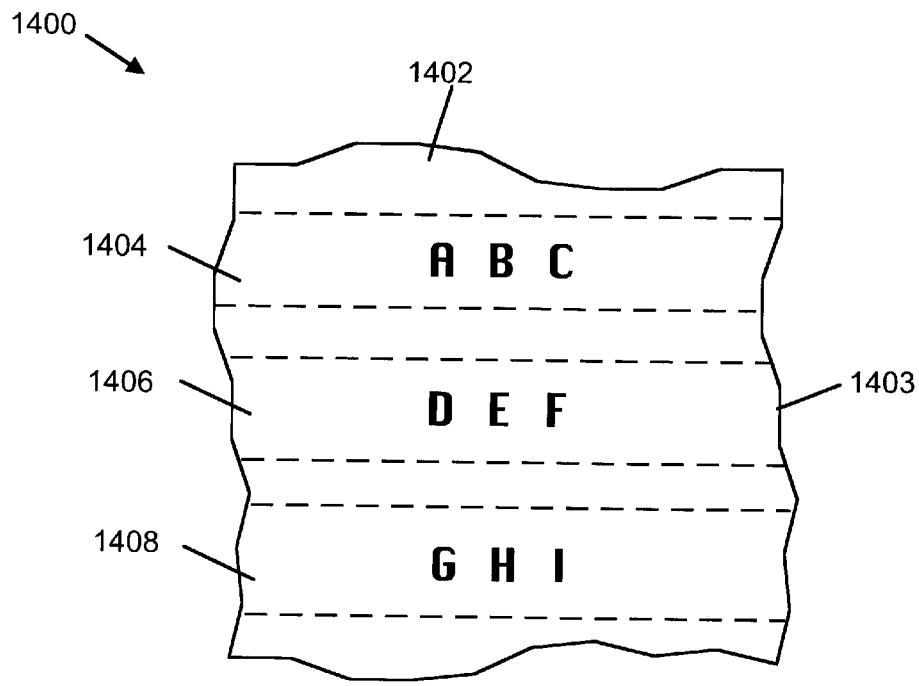
FIGS. 14A and 14B illustrate a list control of the present invention.

In still another aspect, the present invention includes a graphic control element corresponding to a list control such as illustrated at 1400 in FIG. 14A. Again, the basic properties of list controls will be familiar to those skilled in the art of providing graphic user interfaces. In general, the list controls of the invention include a frame 1402 which frame includes list elements such as shown at 1404, 1406 and 1408. The list elements preferably include combinations of text and graphics as described above with respect to FIG. 2. The perimeter of the list frame 1403 can be of arbitrary shape and dimension (e.g., circular, oval, rectangular, rhombic or a combination of arcuate and/or linear segments that form a closed region). It will be appreciated that each of the above-described graphic elements includes a bounding box which is not shown.

Figure 14B:
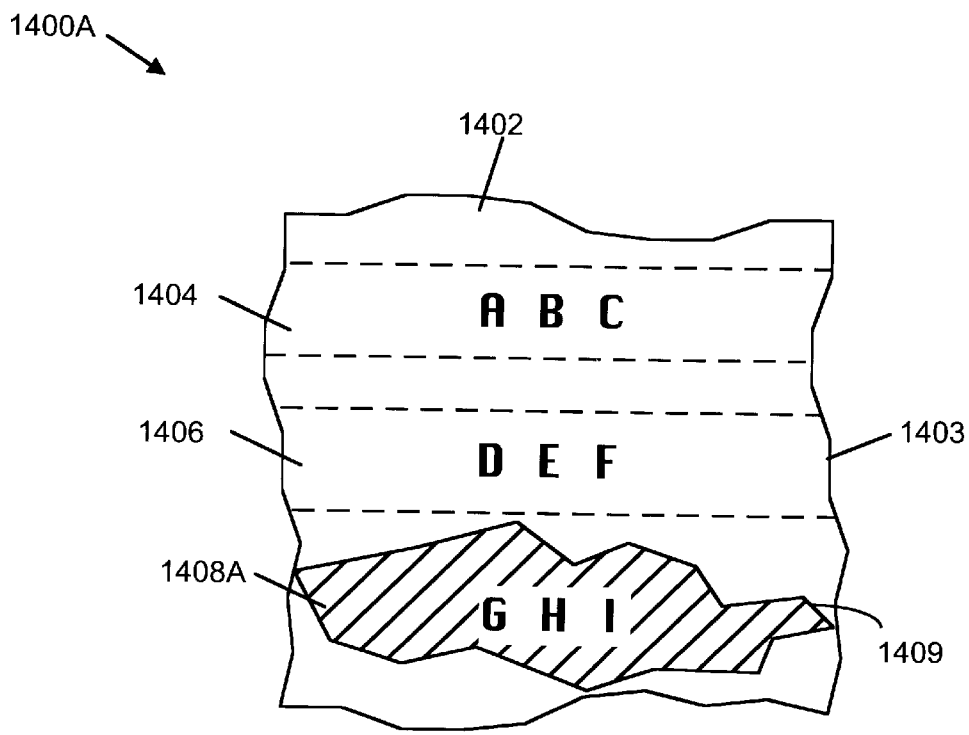

Upon selecting a particular list item the list item is displayed using a graphic control layer corresponding to a selected state such as shown in FIG. 14B at 1408A. Generally, the selection action is effective to indicate the choice of a parameter, such as a file name, that is used by the computer system. It will be appreciated that other actions may be associated with the list elements, however. For example, the list elements may be buttons which are activated as described above upon a user selection action.

In one embodiment, the selected list item is displayed using a graphic layer different from that used to illustrate the non-selected list item. Thus, list item 1408A is shown having a pattern and shape that is different from list item 1408. As noted above, providing such a difference in appearance can increase the efficiency of the user interface by making the states of the user interface controls more ascertainable.

Figure 15:
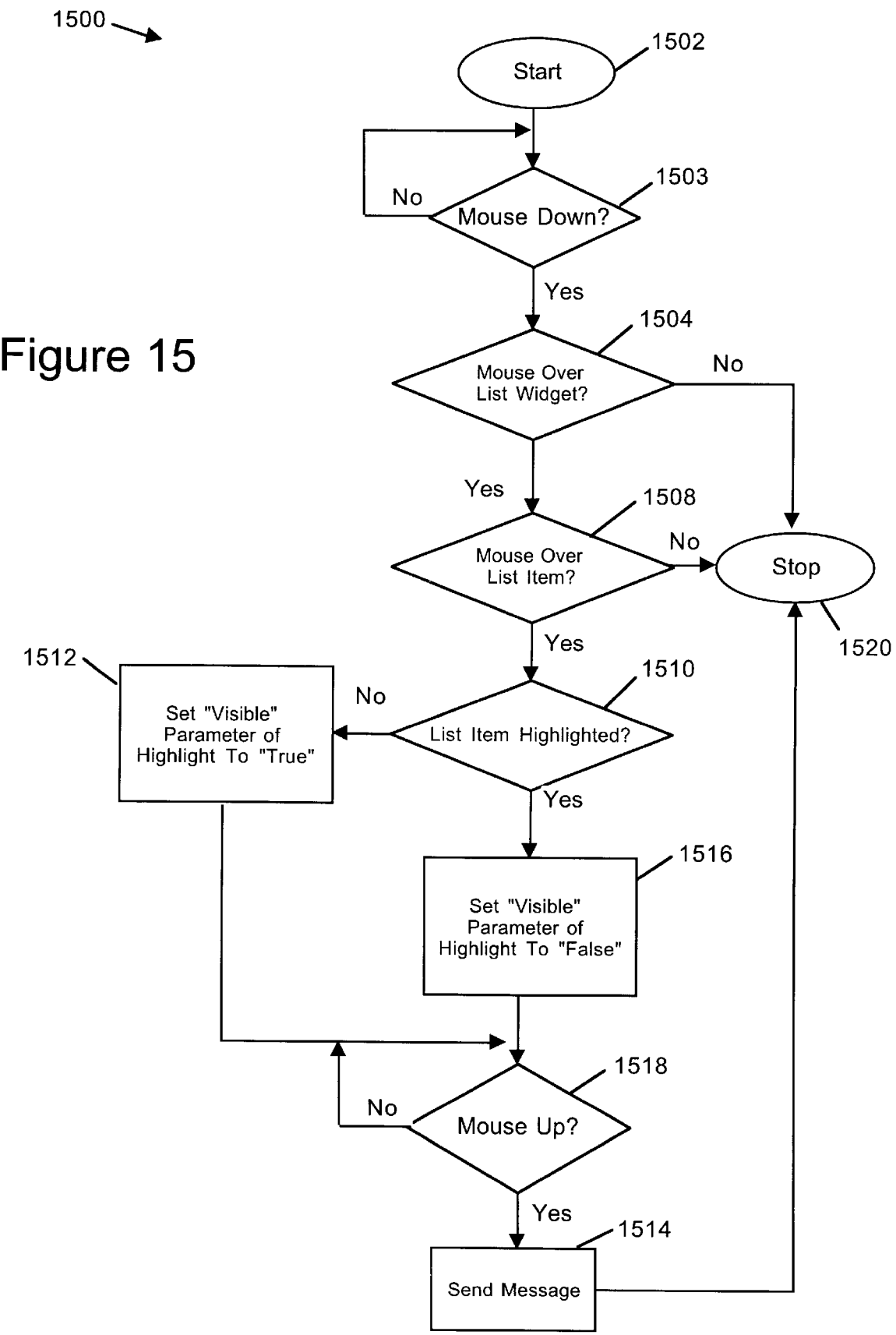
FIG. 15 is a flow diagram illustrating the operation of the list control described in FIG. 14.

The operation of the list graphic control element of the present invention is described in FIG. 15 at 1500. Beginning at step 1502 the system waits until user input action (e.g., a mouse down event) occurs 1503. When such user input action is received at step 1504, the method proceeds to step 1508 to determine whether the mouse is over a graphical control element corresponding to a list control; otherwise, if the mouse is not located over a list widget at step 1504, the method terminates at step 1520. If the mouse is not over a list item at step 1508, the procedure terminates at step 1520. If, however, the user input action has occurred over a list item, then the system determines whether that particular item is already highlighted at step 1510. If the item is not highlighted, then, at step 1512, the "visible" parameter is set to true and an appropriate system message is sent at step 1514 at which point the sequence terminates at step 1520. If the item has already been highlighted then the visible parameter is set to false at step 1516 and the system waits until the user input action ceases (e.g., a mouse up message is received) at step 1518. When the mouse up message is received, control passes to step 1514 as described above.

Thus, it will be seen that the above-described multi-layered graphical control devices provided by the present invention. Using the method and apparatus of the invention, graphical user interface controls are provided that allow a wider variety of user options to be included in a single graphical control element. This allows the creation of more intuitive and sophisticated computer interfaces than heretofore available.

All references cited herein, including patents and patent applications, are incorporated herein by reference in their entirety and for all purposes.

Although the foregoing invention has been described in some detail for purposes of clarity of understanding, it will be apparent that certain changes and modifications may be practiced within the scope of the appended claims. Those of skill in the art will realized that changes may be made to the embodiments and examples described herein without departing from the scope or spirit of the invention.

What is claimed:

1. A multilevel software user interface for controlling the operation of a computer, said multilevel software user interface comprising:

a display providing a user interface control having a plurality of graphic control layers, each of said graphic control layers including an object having a transparent region and an opaque region;

means for generating user input in response to user activation of an input device; and means for processing user input at the user interface control, said means operating such that a user input action over said opaque region of said graphic control layer is effective to generate a particular system message associated with said opaque region for indicating a particular user action at said user interface control and a user input action over said transparent region is effective to transfer said user input action to another graphic control layer.

2. The user interface of claim 1, wherein said opaque region is substantially non-rectangular.

3. The user interface of claim 1, wherein said graphic control layers comprise vector graphic elements.

4. The user interface of claim 1, wherein said graphic control layers comprise bitmap graphic elements.

5. The user interface of claim 1, wherein said plurality graphic control layers are overlapping.

6. The user interface of claim 5, wherein said user input action over said transparent region is effective to transfer said action to the next lower graphic control layer.

7. The user interface of claim 1, wherein said plurality of graphic control layers includes graphic control layers having opaque regions corresponding to push buttons in an unpressed state and graphic control layers having opaque regions corresponding to push buttons in a depressed state.

8. The user interface of claim 1, wherein said graphic control layers having opaque regions correspond to push buttons in an unpressed state and said graphic control layers having opaque regions corresponding to push buttons in a depressed state are displayed selectively in response to user input actions within said opaque regions.

9. The user interface of claim 8, wherein said graphic control layers having opaque regions corresponding to push buttons in a depressed state are displayed in response to a user selection action over said opaque region.

10. The user interface of claim 1, wherein said plurality of graphic control layers includes graphic control layers having opaque regions corresponding to at least first and second active states and first and second inactive states.

11. The user interface of claim 10, wherein the display of said first and second active and inactive states is mutually exclusive.

12. The user interface of claim 1, wherein said plurality of graphic control layers includes graphic control layers having opaque regions corresponding to at least first and second unpressed states and first and second depressed states, wherein said opaque regions of said graphic control layers corresponding to said second unpressed and depressed states include a graphic element not present in said opaque region of said graphic control layer corresponding to said first unpressed and depressed states.

13. The user interface of claim 12, wherein successive user actions are effective to cause successive display of said graphic control layers having opaque regions corresponding to said first unpressed, said first depressed, said second unpressed and said second depressed states.

14. The user interface of claim 13, wherein said plurality of graphic control layers includes graphic control layers corresponding to first, second and third unpressed states and first, second and third depressed states.

15. The user interface of claim 13, wherein said user actions include user selection actions over said opaque regions.

16. The user interface of claim 1, wherein said plurality of graphic control layers includes graphic control layers having opaque regions corresponding to a slider thumb, a lower portion slide and an upper portion slide.

17. The user interface of claim 16, wherein said slider thumb comprises a first graphic layer corresponding to an unpressed state and a second graphic layer corresponding to a depressed state.

18. The user interface of claim 16, wherein said upper and lower slide portions are displayed simultaneously.

19. The user interface of claim 18, wherein said upper and lower slide portions overlap, with the degree of said overlap being controlled by the position of said slider thumb with respect to the termini of said upper portion slide.

20. The user interface of claim 1, wherein each of said opaque regions of said graphic control layers includes a first graphic of text and graphic elements corresponding to an inactive state and a second graphic layer of text and graphic elements corresponding to an active state; and said plurality of graphic control layers are arranged vertically.

21. The user interface of claim 20, further including a scroll bar.

22. A computer user interface system for controlling the operation of a computer, comprising:
   a) means for providing a user interface control having a plurality of graphic control layers, each of said graphic control layers including an object having a transparent region and an opaque region;
   b) means for providing a user input over said opaque and transparent regions of said graphic control layer;
   c) means for indicating particular user activation of the user interface control by generating a particular system message in response to user input over said opaque region; and
   d) means for transferring said user input to another graphic control layer in response to user input over said transparent region, said means itself not indicating user activation of the user interface control.

23. The computer user interface system of claim 22, wherein said opaque region is substantially non-rectangular.

24. The computer user interface system of claim 23, wherein said graphic control layers comprise vector graphic elements.

25. The computer user interface system of claim 23, wherein said graphic control layers comprise bitmap graphic elements.

26. The computer user interface system of claim 22, wherein said plurality of graphic control layers comprises graphic control layers having opaque regions corresponding to push buttons in an unpressed state and graphic control layers having opaque regions corresponding to push buttons in a depressed state.

27. The computer user interface system of claim 22, wherein said plurality of graphic control layers comprises graphic control layers having opaque regions corresponding to at least first and second unpressed states and first and second depressed states, wherein said opaque regions of said graphic control layers corresponding to said second unpressed and depressed states include a graphic element not present in said opaque region of said graphic control layer corresponding to said first unpressed and depressed states.

28. The computer user interface system of claim 22, wherein said plurality of graphic control layers includes graphic control layers having opaque regions corresponding to a slider thumb, a lower portion slide and an upper portion slide.

29. The computer user interface system of claim 28, wherein said slider thumb comprises a first graphic layer corresponding to an unpressed state and a second graphic layer corresponding to a depressed state.

30. The computer user interface system of claim 22, wherein each of said opaque regions of said graphic control layers includes a first graphic of text and graphic elements corresponding to an inactive state and a second graphic layer of text and graphic elements corresponding to an active state; and said plurality of graphic control layers are arranged vertically.

31. The computer user interface system of claim 30, further including a scroll bar.

32. A method for controlling the operation of a computer system using a multilevel software user interface having a user input device, the method comprising the steps of:
   a) providing a plurality graphic user interface controls for receiving user input, each graphic user interface control having a plurality of graphic control layers, each of said graphic control layers including an object having a transparent region and an opaque region, said graphic control layers being stacked such that user input action over a transparent region can be transferred to a next lower graphic control layer;
   b) generating a user input action over a particular graphic control layer of said plurality of graphic control layers;
   c) determining whether said user input action occurred over one of said opaque region or said transparent region of said particular graphic control layer;
   d) transferring said user input action to the next lower graphic control layer in response to a determination that said user input action occurred over said transparent region of said particular graphic control layer; and
   e) repeating steps c) and d) for each graphic control layer in said plurality of graphic control layers until either said user input action is determined to occur over the opaque region of one of said graphic control layers or all of said plurality of graphic control layers have been traversed.

33. The method of claim 32, wherein said step of determining whether said user input action occurred over one of said opaque or transparent regions comprises the steps of:
   a) identifying whether said object in said graphic control layer is a bitmap object;
   b) retrieving the object layer of said graphic control layer;
   c) determining the position of said user input device; and
   d) determining the opacity of the bit at the position of said user input device.

34. The method of claim 32, further comprising the step of generating a system message in response to a determination that said user input action occurred over an opaque region of one of said plurality of graphic control layers, for indicating a particular user input action at the graphic user interface control associated with the opaque region.

35. The method of claim 34, wherein said plurality of graphic control layers include a visible first layer having an opaque region corresponding to an unpressed push button and a hidden second layer having an opaque region corresponding to depressed push button, and said step of generating a system message further includes the step of hiding said first layer and displaying said second layer.

36. The method of claim 35, further including the step of hiding said first layer and displaying said second layer in response to a determination that said user input device is over said opaque region.

37. The method of claim 32, wherein said plurality of graphic control layers correspond to at least first and second unpressed states and first and second depressed states, wherein said opaque regions of said graphic control layers corresponding to said second unpressed and depressed states include a graphic element not present in said opaque region of said graphic control layer corresponding to said first unpressed and depressed states, said plurality of graphic control layers being arranged such that when said graphic control layer corresponding to said first unpressed state is displayed prior to a user input action, successive user input actions over the opaque regions of said graphic control layers cause the display of said graphic control layers corresponding to said first depressed state, said second unpressed state and said second depressed state respectively.

38. The method of claim 37, wherein said graphic control layer corresponding to said first unpressed state is displayed in response to a user input action over the opaque regions of said graphic control layer corresponding to said second depressed state.

39. The method of claim 38 further including the step of generating system messages in response to a user input actions over said opaque regions.

40. The method of claim 32 wherein said plurality of graphic control layers includes graphic control layers having opaque regions corresponding to at least first and second pressed states and first and second unpressed states and wherein said pressed states are displayed during said user input actions.

41. The method of claim 40, wherein said user input action is a mouse button down event.

42. The method of claim 41, wherein said user input action are effective to toggle the display of said graphic control layers from said first pressed state to said second pressed stated and from said second pressed state to said first pressed state.

43. The method of claim 42, further including the step of generating a system message in response to said user input action.

44. The method of claim 32, wherein said plurality of graphic control layers includes graphic control layers having opaque regions corresponding to a slider thumb, a lower portion slide and an upper portion slide, said graphic control layers being arranged such that said upper and lower portion slides are overlapping and displayed simultaneously, wherein the degree of overlap is controlled in response to user input actions over said slider thumb.

45. The method of claim 44, wherein said slider thumb comprises a first graphic layer corresponding to an unpressed state and a second graphic layer corresponding to a depressed state, and wherein said depressed state is displayed in response to a user input action over said slider thumb.

46. The method of claim 32, wherein each of said opaque regions of said graphic control layers includes a first graphic of text and graphic elements corresponding to an inactive state and a second graphic layer of text and graphic elements corresponding to an active state; said plurality of graphic control layers being arranged vertically; and wherein a displayed graphic control layer corresponding to an inactive state is hidden and a hidden graphic control layer corresponding to an active state is displayed in response to a user input action over the opaque region of said displayed graphic control layer corresponding to an inactive state.

47. The method of claim 46, further including the step of displaying a scroll bar.

* * * * *